United States Patent
Khandani

(10) Patent No.: US 11,777,715 B2
(45) Date of Patent: Oct. 3, 2023

(54) METHOD AND APPARATUS FOR GENERATING SHARED SECRETS

(71) Applicant: Amir Keyvan Khandani, Kitchener (CA)

(72) Inventor: Amir Keyvan Khandani, Kitchener (CA)

(*) Notice: Subject to any disclaimer, the term of this patent is extended or adjusted under 35 U.S.C. 154(b) by 540 days.

(21) Appl. No.: 16/875,970

(22) Filed: May 15, 2020

(65) Prior Publication Data

US 2020/0366468 A1    Nov. 19, 2020

Related U.S. Application Data

(60) Provisional application No. 62/848,435, filed on May 15, 2019.

(51) Int. Cl.

| | |
|---|---|
| *H04L 9/08* | (2006.01) |
| *H04L 1/18* | (2023.01) |
| *H04L 1/1607* | (2023.01) |
| *H04L 12/18* | (2006.01) |
| *H04L 69/16* | (2022.01) |
| *H04L 12/06* | (2006.01) |
| *H04L 9/40* | (2022.01) |

(52) U.S. Cl.
CPC .......... *H04L 9/0816* (2013.01); *H04L 1/1614* (2013.01); *H04L 1/18* (2013.01); *H04L 12/06* (2013.01); *H04L 12/1845* (2013.01); *H04L 63/061* (2013.01); *H04L 69/16* (2013.01)

(58) Field of Classification Search
CPC ....... H04L 9/0816; H04L 1/1614; H04L 1/18; H04L 12/06; H04L 12/1845; H04L 63/061; H04L 69/16; H04L 63/083; H04L 1/0003; H04L 12/1868; H04L 2001/0093; H04L 9/0861; H04L 9/3226; H04L 69/161; H04L 12/403; H04W 12/06
See application file for complete search history.

(56) References Cited

U.S. PATENT DOCUMENTS

| | | |
|---|---|---|
| 6,026,167 A | 2/2000 | Aziz |
| 6,781,991 B1 | 8/2004 | Anderlind |

(Continued)

FOREIGN PATENT DOCUMENTS

| | | |
|---|---|---|
| WO | 1994028585 | 12/1994 |
| WO | 1996022643 | 7/1996 |

OTHER PUBLICATIONS

Ding, Cunsheng, et al., "A Generic Construction of Cartesian Authentication Codes", IEEE Transactions on Information Theory, vol. 53, No. 6, Jun. 2007, 2229-2235.

(Continued)

*Primary Examiner* — Hardikkumar D Patel
(74) *Attorney, Agent, or Firm* — Invention Mine LLC

(57) ABSTRACT

A method for generating a shared secret is disclosed. In an example embodiment, a sequence of data packets is transmitted from a first node to a second node. A packet error bitmap corresponding to packets in the sequence of packets that are received correctly in a first transmission attempt is generated at the second node. Further, the packet error bitmap is transmitted from the second node to the first node. Then, the first node and the second node separately mixes the packets received correctly in the first transmission attempt to generate the shared secret.

18 Claims, 15 Drawing Sheets

(56) References Cited

U.S. PATENT DOCUMENTS

| | | |
|---|---|---|
| 7,991,160 B2 | 8/2011 | Guccione |
| 8,208,628 B2 | 6/2012 | Yener |
| 8,238,551 B2 | 8/2012 | Reznik |
| 8,280,046 B2 | 10/2012 | Rudolf |
| 8,423,986 B1 | 4/2013 | Grechanik |
| 8,520,855 B1 | 8/2013 | Kohno |
| 9,130,693 B2 | 9/2015 | Reznik |
| 9,292,711 B1 | 3/2016 | Roth et al. |
| 9,319,877 B2 | 4/2016 | Ando |
| 9,438,421 B1 | 9/2016 | Roth et al. |
| 9,794,238 B2 | 10/2017 | Wood et al. |
| 10,067,746 B1 | 9/2018 | Yu |
| 10,068,228 B1 | 9/2018 | Winklevoss |
| 10,097,521 B2 | 10/2018 | Wood |
| 11,057,204 B2 | 7/2021 | Khandani |
| 11,146,395 B2 | 10/2021 | Khandani |
| 2001/0024434 A1 | 9/2001 | Ayyagari et al. |
| 2003/0063751 A1 | 4/2003 | Bruen |
| 2003/0204728 A1 | 10/2003 | Irwin |
| 2004/0078567 A1 | 4/2004 | Newbould |
| 2005/0281242 A1* | 12/2005 | Sutivong ............... H04L 5/003 370/344 |
| 2007/0036353 A1 | 2/2007 | Reznik |
| 2007/0070902 A1 | 3/2007 | Elaoud et al. |
| 2007/0118749 A1 | 5/2007 | Hagn |
| 2007/0177729 A1 | 8/2007 | Reznik |
| 2007/0189528 A1 | 8/2007 | Ueda |
| 2008/0123851 A1 | 5/2008 | Guccione |
| 2008/0294970 A1 | 11/2008 | Gross et al. |
| 2009/0100313 A1 | 4/2009 | Gross et al. |
| 2009/0141900 A1 | 6/2009 | Ye |
| 2009/0190558 A1 | 7/2009 | Strutt et al. |
| 2010/0153742 A1 | 6/2010 | Kuo et al. |
| 2011/0299386 A1 | 12/2011 | Negoto et al. |
| 2012/0144423 A1* | 6/2012 | Kim ..................... H04N 21/482 725/38 |
| 2012/0245941 A1 | 9/2012 | Cheyer |
| 2012/0281834 A1 | 11/2012 | Reznik |
| 2012/0284788 A1 | 11/2012 | Fernandez |
| 2012/0311121 A1* | 12/2012 | Shafrir ................... H04L 69/22 709/223 |
| 2014/0006797 A1 | 1/2014 | Cordella et al. |
| 2014/0157367 A1 | 6/2014 | Zhang |
| 2014/0331061 A1 | 11/2014 | Wright |
| 2015/0071139 A1 | 3/2015 | Nix |
| 2015/0085830 A1 | 3/2015 | Nozaki et al. |
| 2015/0095989 A1* | 4/2015 | An ......................... H04L 63/10 726/4 |
| 2015/0146539 A1 | 5/2015 | Mehta et al. |
| 2015/0172061 A1* | 6/2015 | Lee ...................... H04W 12/04 713/176 |
| 2015/0245296 A1 | 8/2015 | Tyson et al. |
| 2015/0261973 A1 | 9/2015 | O'Hare |
| 2016/0283937 A1 | 9/2016 | Reese |
| 2016/0321654 A1 | 11/2016 | Lesavich et al. |
| 2017/0161635 A1 | 6/2017 | Oono et al. |
| 2017/0214608 A1* | 7/2017 | Jilani ................... H04L 45/586 |
| 2018/0075347 A1 | 3/2018 | Alistarh et al. |
| 2018/0199205 A1* | 7/2018 | Zhu ...................... H04L 9/0825 |
| 2018/0269960 A1* | 9/2018 | Jones ................... H04L 1/0041 |
| 2018/0288019 A1 | 10/2018 | Dinia |
| 2018/0359084 A1 | 12/2018 | Jain et al. |
| 2018/0365021 A1 | 12/2018 | Chen et al. |
| 2018/0373978 A1 | 12/2018 | Yu et al. |
| 2019/0081884 A1 | 3/2019 | Spohn et al. |
| 2020/0044790 A1* | 2/2020 | Vaidya ................. H04L 1/1861 |
| 2020/0204546 A1 | 6/2020 | Li |
| 2020/0366468 A1 | 11/2020 | Khandani |
| 2021/0091942 A1 | 3/2021 | Nguyen |

OTHER PUBLICATIONS

Aono T et al: "Wireless secret key generation exploiting reactance-domain scalar response of multipath fading channels", IEEE Transactions on Antennas and Propagation, IEEE Service Center, Piscataway, NJ, US, vol. 53, No. 11, Nov. 1, 2005 (Nov. 1, 2005), pp. 3776-3784 (9 pages), XP001512766, ISSN: 0018-926X, DOI: 10.1109/TAP.2005.858853.

* cited by examiner

METHOD AND APPARATUS FOR GENERATING SHARED SECRETS

CROSS-REFERENCE TO RELATED APPLICATIONS

The present application is a non-provisional filing of, and claims benefit under 35 U.S.C. § 119(e) from, U.S. Provisional Patent Application Ser. No. 62/848,435, filed May 15, 2019, entitled "A Method and Apparatus for Generating Shared Secrets," which is incorporated herein by reference in its entirety.

BACKGROUND

Many of the problems encountered in the area of security, such as authentication and encryption, are based on sharing some of form of a secret phrase between two points, for example between a client node and a server node, or between a router (e.g., an access point/gateway) and a client device served by such router. Passwords and symmetrical encryption keys are examples of the application of such a shared secret. Unfortunately, such shared secret normally requires some form of an exchange or notification of the shared secret between legitimate nodes that intend to communicate. As such, the shared secret becomes vulnerable to interception by undesirable parties (e.g., eavesdroppers/hackers), thus compromising security of communications between the legitimate parties.

Hence, there is a need for more reliable methods for generating such a shared secret, without disclosing any information about its content. It is also desirable to be able to change the shared secret over time to further provide an increased security.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
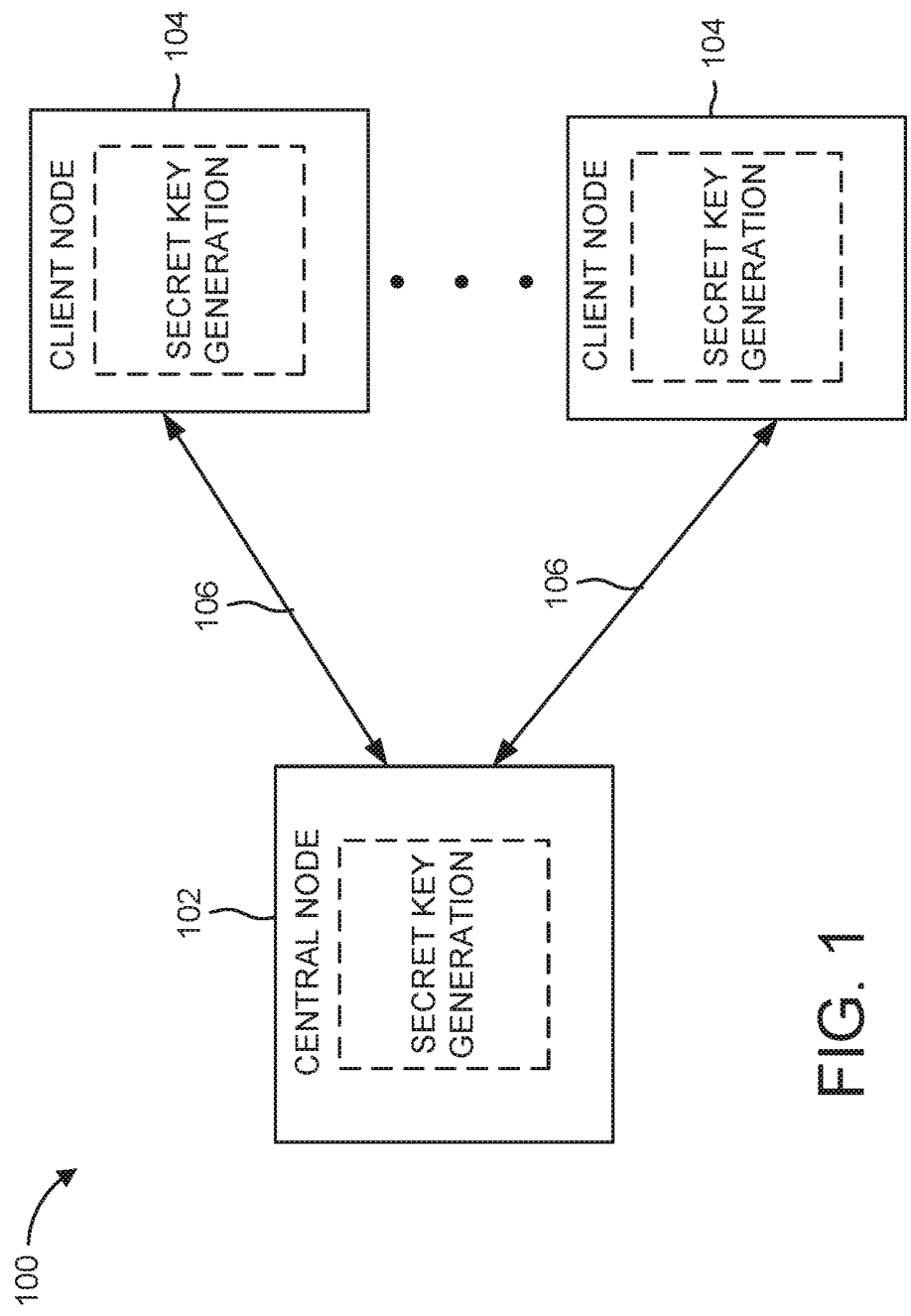
FIG. 1 illustrates an example of a network arrangement in which embodiments of the present disclosure may be employed.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description of the drawings.

DETAILED DESCRIPTION

In general, current methods used for sharing secrets (e.g., passwords and/or cryptographic) keys) using a public channel, such as Diffie-Hellman key exchange and password hashing, have several shortcomings. In particular, typically, information sent over the public channel about a shared secret contains the shared secret itself. This means the information sent over the public channel is theoretically adequate for an eavesdropper to recover the shared secret. Even if the shared secret is intercepted by an eavesdropper, the operation for reconstruction of the shared secret by the eavesdropper is ideally supposed to have an insurmountable computational complexity, which is normally the only safeguard against the eavesdropper to gain access to the shared secret.

However, with continuous advancements in computer technology and hacking techniques, a concern exists that current techniques for secret sharing will not be able to keep up. Another concern is that hackers can record current communications transmitted over the Internet, and decipher those communications when advancements in computing technologies so permit.

Noting these shortcomings, it is desirable to have access to techniques that may permit generating shared secrets without disclosing any information about the content of such shared secret (e.g., a password or an encryption key). According to some embodiments of the present disclosure, a lack of information disclosure about a shared secret generally refers to the probability that an eavesdropper can extract a shared secret is extremely relatively small, such as $10^{-100}$. In some embodiments, this probability may be further reduced by frequently updating the shared secret, preferably, e.g., upon establishing any new connection, and mixing shared secrets generated over an extended period of time. It should be added that, in general, the term "secure communications" in an information-theoretical sense entails that the probability of a successful hacking can be made unboundedly small. Embodiments of the present disclosure embrace a similar notion.

Data communications over many types of communications channels, such as wireless channels, is typically achieved by sending the data in packets, and is often accompanied with a packet error. A packet in error generally refers to a packet in which some of the bits within the transmitted packet are being received in error. The packet error rate refers to the percentage of packets received in error and/or or not received at all relative to the total number of packets transmitted over a channel. Although various methods of the present disclosure may be applied to a wide range of channels, such as, for example, the Internet, hereafter the details of different embodiments will be illustrated in the context of transmission over a wireless channel. However, it will be appreciated that embodiments of the present disclosure may be applied to other types of channels, including wired channels or hybrid channels composed of wired and wireless links. It should be noted, however, that different embodiments of the present disclosure may be particularly beneficial with respect to wireless channels, given their increased susceptibility to eavesdropping and other forms of security breaches.

Example of wireless channels includes: (1) Local Area Network (WLAN) realized based on IEEE802.11 standard (also known as Wi-Fi), (2) Bluetooth, (3) Zigbee, (4) LoRA, (5) SigFox, (6) Near Field Communications (NFL), (7) Long Term Evolution (LTE) and other standards for cellular wireless communications (e.g., Global System for Mobile Communications—GSM), (8) satellite communications, (9) 5G New Radio (NR), etc. All these standards rely on sending packets of data, which is often accompanied by a noticeable packet error rate.

Methods of the present disclosure aim to exploit the packet error rate associated with a transmission over a communication channel, such as a wireless channel. However, according to the embodiments disclosed herein, it is desirable that such packet error events are relatively rare for a communication link (channel) connecting legitimate nodes (the two nodes aiming to establish a shared secret), but it is relatively high for any eavesdropper who may be listening to the channel. In addition, it is desirable that the error events for the legitimate link are independent of the error events observed by an eavesdropper's receiver.

FIG. 1 illustrates an example of a network arrangement 100 in which embodiments of the present disclosure may be employed. As illustrated in FIG. 1, the network arrangement 100 includes a central (master) node 102 that may serve/communicate with one or more client (slave) nodes 104. The central node 102 may communicate with each of the client nodes 104 over communications links 106, such as wireless communications links operating in accordance with a suitable communication standard/protocol (e.g., IEEE 802.11, LTE, etc.). The central node 102 may be configured (e.g., equipped with suitable hardware and programmed with suitable software/firmware) to establish secure communications with each of the client nodes 104. Similarly, each of the client nodes 104 may be configured appropriately (e.g., programmed with a suitable software) to engage in a communication exchange with the central node 102.

Note that, as used herein, the terms, such as "a central node", "a client node", "a master node", "a slave node", "a master," "a slave," "a server", "a client," and/or the like, may be used interchangeably in different places. The central node 102 may take various forms, examples of which include a router (e.g., a Wi-Fi router (also commonly referred to as an access point), a gateway (e.g., an IoT gateway, a base station, a server, etc.). Each client node 104 may be any suitable device capable of communicating with the central node 102, some examples of which include a personal computer, a mobile computer (e.g., a laptop), a handheld mobile device (e.g. a smartphone), a personal digital assistant (PDA), or an IoT sensor node. As further shown in FIG. 1, in accordance with various embodiments disclosed herein, as will be described in detail, each of the nodes 102 and 104 may be configured to generate a secure secret (e.g., a password and/or an encryption key) for secure communications within the network arrangement 100.

As will be described in more detail, in general, embodiments of the present disclosure exploit an erroneous behavior of communication links, and in particular wireless links, to establish a shared secret. More particularly, a subset of packets exchanged between, e.g., two nodes that are free of error may serve as a basis for generating a secret key for secure communications between the two nodes. Various methods disclosed herein may further serve to secure communications between the nodes against potential eavesdroppers/hackers.

One example method disclosed herein, in accordance with some embodiments may include: transmitting a sequence of packets (e.g., UDP (User Datagram Protocol) packets) from a first node (e.g., a router) to a second node (e.g., a client node); generating a packet error bitmap corresponding to packets in the sequence of packets received in error; transmitting the packet error bitmap from the second node to the first node; and the first node and the second node independently (separately) mixing the packets received correctly (free of error) to generate a shared secret. In some illustrative embodiments, the sequence of packets is transmitted in a broadcast mode. Further, in some embodiments, mixing of the packets received correctly may be performed, for example, using a cryptographic hash function, bit-wise XOR of the packets' contents, and or a combination thereof.

Typically, different layers of a protocol stack (e.g., based on an OSI model) have mechanisms for retransmission of erroneous packets. In most wireless standards, the lowest layers (PHY and MAC layers) have their own retransmission scheme called Automatic Repeat Request (ARQ). Normally, a number of such retransmission attempts is limited. On the other hand, the network layer of the protocol stack can rely, e.g., on Transmission Control Protocol/Internet Protocol (TCP/IP), User Datagram Protocol (UDP), or Data Broadcasting. As a connection-oriented protocol, TCP/IP is equipped with a retransmission mechanism at the network layer, while, as a connectionless protocol, UDP lacks such a retransmission mechanism.

In the methods of the present disclosure, according to some embodiments, it is desirable to: (1) remain compatible with the underlying standard governing a given communication channel in order to reduce cost and maintain compatibility, and (2) avoid (or at least reduce) a number of retransmissions. For example, by using UDP to send data packets, currently, no retransmission occurs at the network layer. However, many standards have their own built-in retransmission mechanism at lower layers, such as PHY and/or MAC layer retransmissions, even when UDP is used for signaling at the network layer. In data broadcasting, UDP packets are sent at the network layer, and the ARQ at the lower layers of the protocol stack (e.g., at PHY/MAC layers) is disabled. Various embodiments of the present disclosure utilize data broadcasting. An example of a wireless standard permitting data broadcasting is Wi-Fi.

Further, to handle the standards that do not support data broadcasting or in scenarios where it may be difficult to realize data broadcasting for an end-user, embodiments of the present disclosure may rely on sending UDP packets and on a mechanism to separate the packets that are received (by a legitimate receiver) in the first transmission attempt from those packets that are received in following re-transmission attempt(s). This means, for example, separating packets that have not been retransmitted due to the ARQ at the PHY/MAC layer. Such packets are more likely to be received in error by an eavesdropper because the eavesdropper cannot initiate a request for retransmission, and consequently, has been able to listen to and detect those packets only once.

Note that packet error events for different receivers are independent of each other. Assume that the packet error rate for a legitimate receiver is $P_l$ and for an eavesdropper is equal to $P_e$. Any given packet will be received correctly (in its first transmission attempt) by the legitimate receiver with probability $(1-P_l)$, and the probability that the eavesdropper receives the same packet correctly will be $(1-P_e)$. On the other hand, if a packet is transmitted twice until it is received correctly by the legitimate receiver, the probability that the eavesdropper receives the same packet correctly will be $(1-P_e^2)$, where $(1-P_e^2)>(1-P_e)$. This means that packets that are received correctly in their first transmission attempt will have a lower probability of being received correctly by the eavesdropper as compared to packets that are not received correctly in the first attempt and have been retransmitted once or multiple times.

Next, an example of a mechanism to separate packets that are received correctly in the first transmission attempt is explained in more detail.

In some embodiments, a legitimate transmitter acting as a master (e.g., the central node 102, as in FIG. 1) in secret sharing transmits a sequence of packets at regular time intervals. Then, the time each such packet is received at the legitimate receiver (acting as a slave in generating the shared secret, such as the client node 104, for instance, as in FIG. 1) will be recorded by the slave node. The received packets may be classified into two classes according to their received times which are indicative of a number of retransmission attempts. Subsequently, the packets belonging to the class with the shortest travel time will be selected to be used in a key generation algorithm. This particular approach is especially beneficial for use in a communication protocol/standard in which disabling re-transmission attempts is either not easily feasible or perhaps not possible at all. LTE is an example of such protocol/standard in which data broadcasting (no re-transmission attempts) is not easily feasible and the above-described mechanism may be used to overcome that challenge while maintaining compatibility with the underlying standard.

According to illustrative embodiments of the present disclosure, error events serve as a primary basis for generation of a shared secret (e.g., a password and/or an encryption key). However, in some embodiments, it is also desirable that the probability of (packet) error is as low as possible for a legitimate node acting as a slave and as high as possible for possible eavesdropper(s). In general, controlling the probability of error for eavesdroppers is difficult. For this reason, embodiments of the present disclosure aim at: (1) minimizing the probability of error for the legitimate receiver, and (2) making sure that packets contributing to generation of the shared secret are sent over an extended period of time. This may create conditions under which a potential eavesdropper will experience both good and bad channel conditions in listening to the packets used in secret sharing. Consequently, the eavesdropper may experience an average error behavior, and some packet errors, over time.

In this regard, to provide the best channel conditions possible for the legitimate node, in some embodiments, the packets for secret sharing are transmitted when the legitimate receiver enjoys a high signal-to-noise ratio (good channel condition). In addition, a level of the transmit power is reduced, and the index of coding/modulation (e.g., as known in the Wi-Fi and other standards), as well as a given configuration of transmit antennas in space-time coding scheme (if so employed), may be selected to increase the probability of error for an arbitrary receiver (such as the eavesdropper, for instance). These operations are performed while controlling the error probability for the legitimate node. In some embodiments, this error control may achieved by employing a closed-loop monitoring of the error rate (and closed-loop adjustment of a number of parameters (such as, e.g., those described above) for the legitimate link. In general, the goal is to provide an adequate number of error-free packets for the legitimate receiver node (slave node) while maximizing the probability of error for potential eavesdropper(s).

Various embodiments of the present disclosure will now be described in more detail.

Figure 2:
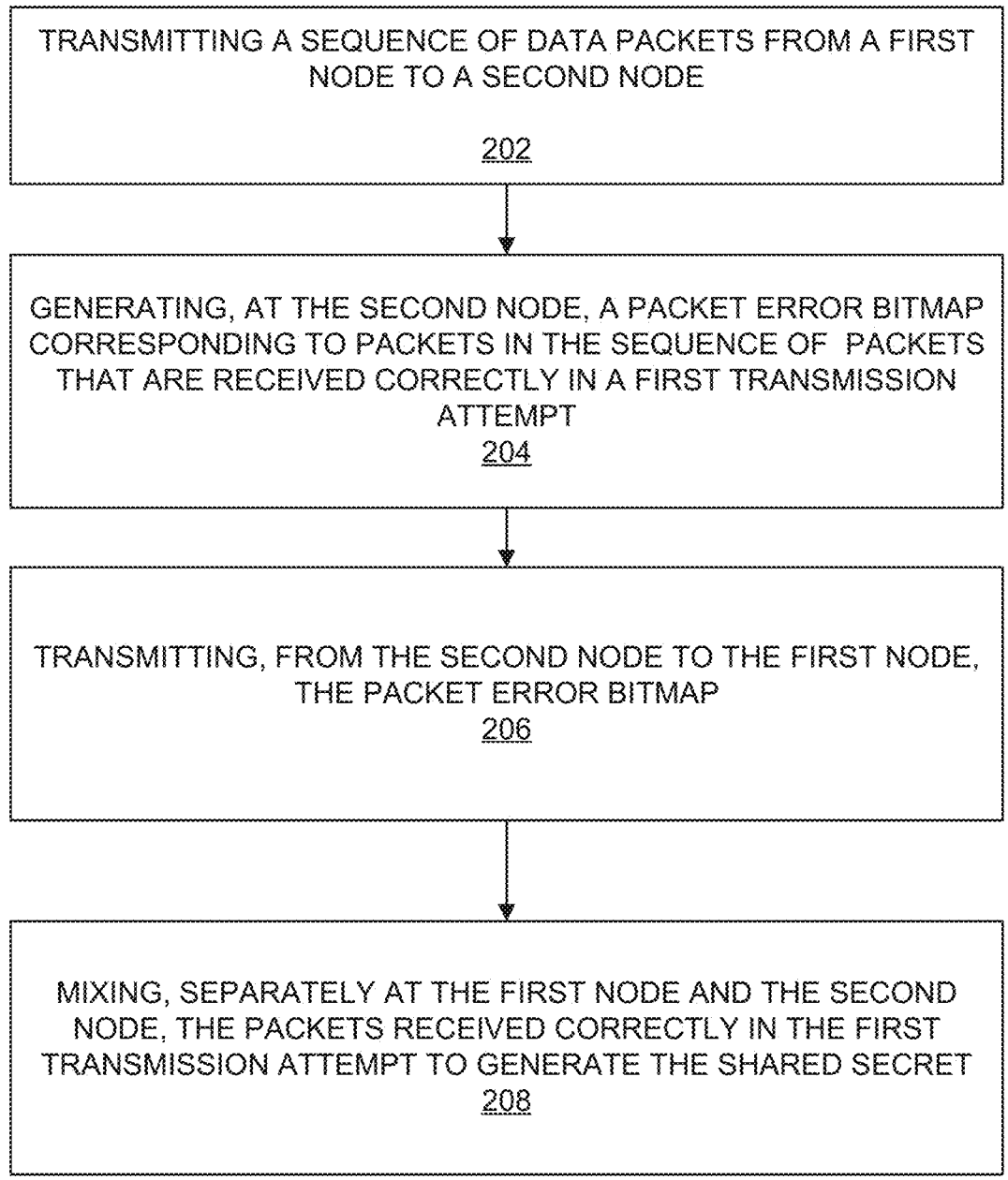
FIG. 2 is a flow chart illustrating a method for generating a shared secret between a first node and a second node, in accordance with some embodiments.

FIG. 2 is a flow chart illustrating a method 200 for generating a shared secret between a first node and a second node, in accordance with some embodiments. In an example embodiment, the first node may be a (legitimate) master node, such as a wireless router for instance, and the second node may be a (legitimate) slave node, such as a client node, for instance, served by the wireless router.

As shown in FIG. 2, step 202 involves transmitting a sequence of data packets from the first node to the second node. Then, step 204 involves generating, at the second node a packet error bitmap corresponding to packets in the sequence of packets that are received correctly (free of error) in the first transmission attempt. Error free packets may be determined using error detection mechanisms, such as Cyclic Redundancy Check (CRC) values. If needed, the CRC can be added to the raw data prior to filling the packet (with raw data plus added CRC). Then, step 206 involves the second node transmitting the packet error bitmap to the first node. Finally, step 208 involves mixing, separately at the first node and the second node, the packets received correctly (free of error) in the first transmission attempt to generate the shared secret. Accordingly, each node mixes independently (separately) the packets received correctly in the first transmission attempt to generate the shared secret. Hence, the generated shared secret does not need to be communicated between the two nodes (such as over a wireless channel) where during such communication it might be potentially intercepted by an illegitimate party. Hence, the shared secret generated in accordance with various embodiments of the present disclosure provides an enhanced level of security.

In some embodiments, the generated shared secret may be used as an encryption key for secure communications between the first node and the second node. Alternatively, or in addition to, the generated shared secret may be used as a password for authentication between the first node and the second node.

With respect to FIG. 2, packets that are received error-free at the legitimate slave node are a subset of an overall number of packets sent by the legitimate master node. According to an embodiment, the packets in this subset are used in the construction of the shared secret. To proceed, the legitimate slave node needs to inform the legitimate master node of the indices of the packets available (received) at the legitimate slave node. It should be noted that the indices of packets do not disclose any information about the content of the packets. Once the legitimate master node becomes aware of the indices of the packets that were received error-free and are available at the legitimate slave node, these packets will be mixed using, for example, cryptographic hash functions and the result will be used as the shared secret. Due to hashing, if an eavesdropper lacks a subset of the packets received error-free at the legitimate slave node, or has some of the bits in at least one of these packets in error, the result of hashing will be different from the result obtained by the legitimate nodes. Alternatively, in some embodiments, the error-free packets may be mixed independently at both ends using other methods.

Note that, in accordance with embodiments disclosed herein, a master (central) node and a client (slave) node may be configured accordingly (e.g., equipped with suitable hardware and programmed with suitable software (e.g., an application software)) to carry out various functions disclosed herein. In some embodiments, a client device, for example, may be configured with a suitable application program, in accordance with, e.g., instructions, directives, etc. received from the master node or during an initial set up (e.g., of a router), or by receiving application software directly from the master node for download and execution on the client device. Other examples may be possible as well.

Figure 3:
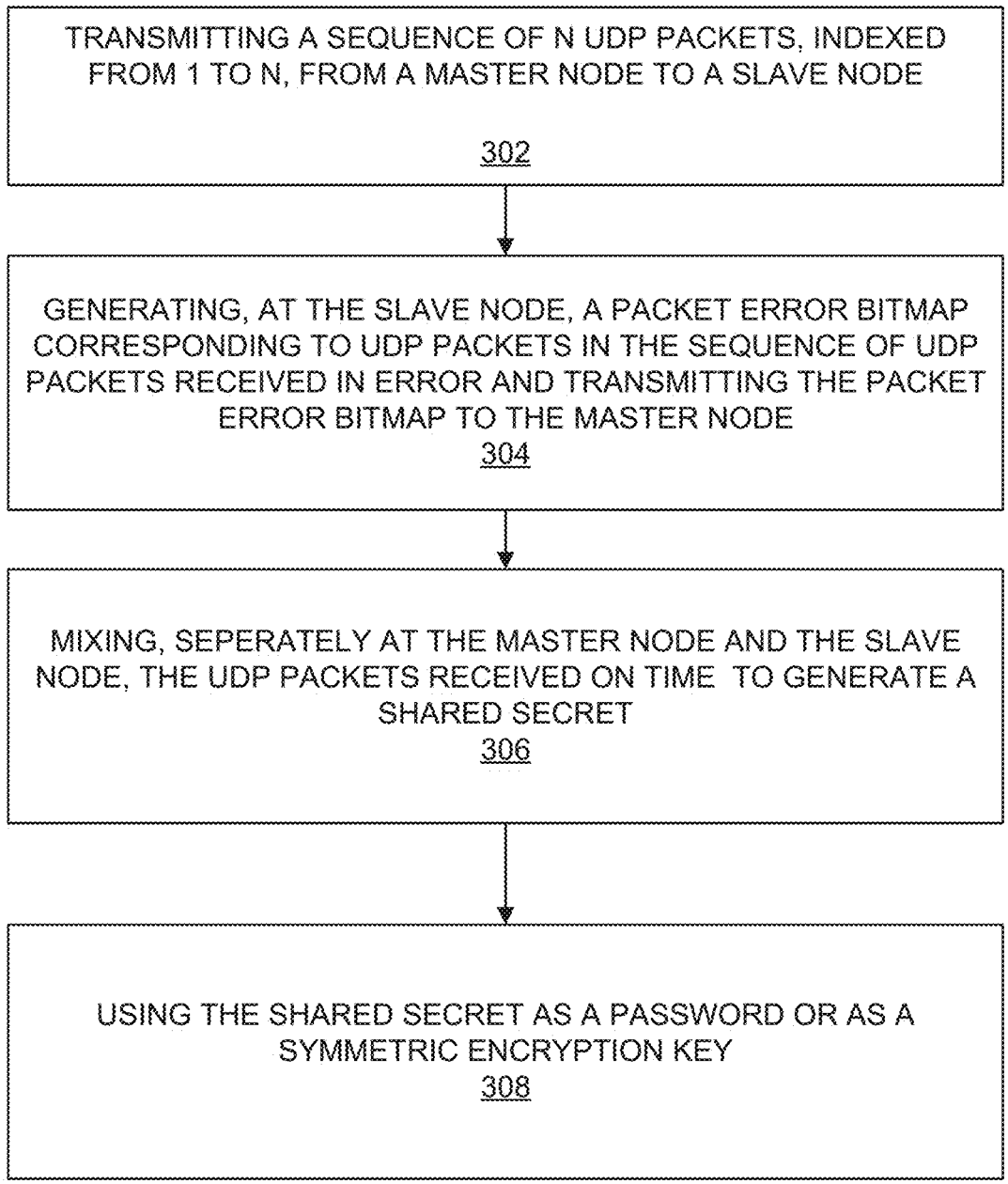
FIG. 3 is a flow chart illustrating an example method for generating a shared secret between a first node and a second node involving a transmission of UDP packets, in accordance with some embodiments.

FIG. 3 is a flow chart illustrating an example method 300 for generating a shared secret between a first node and a second node involving a transmission of UDP packets, in accordance with some embodiments. In the example embodiment of FIG. 3 a method 300 is performed by a master node and a slave node. Further the example method 300 shown in FIG. 3 is carried out in the context of UDP. However, it should be understood, that a similar process may be applied in embodiments involving any now existing or later available suitable communication protocol(s).

As illustrated, in 302, the master node (e.g., a router (e.g., a Wi-Fi router/access point or a gateway (e.g., an IoT gateway) sends a sequence of N UDP packets, indexed from 1 to N to the slave node (e.g. a wireless client device connecting to the router or gateway, such as a mobile device (e.g., a laptop computer, a smartphone, or an IoT sensor node). Each packet has a respective index and contains K, e.g., 256, random bits. In an example embodiment, the sequence of packets is sent in a broadcast mode, without a re-transmission mechanism. In 304, the slave node generates a packet error bitmap corresponding to the UDP packets in the sequence of the UDP packets received in error, and transmits the packet error bitmap to the master node. In this regard, in some embodiments, the slave node reads respective indices of the UDP packets received correctly (without error), and forms an error bitmap vector. This is a vector of size N bits, where N is the total number of UDP packets transmitted by the master node. The k'th bit position in the error bitmap vector is set to 1 if the k'th packet is received correctly at the slave node and is set to zero, otherwise. The error bitmap vector is transmitted to the master node, such as over a secure channel. For example, if a shared secret has been previously generated by the master node and the slave node, the channel between the two nodes may be encrypted using the previously generated shared secret for transmission of the error bitmap vector.

Figure 4:
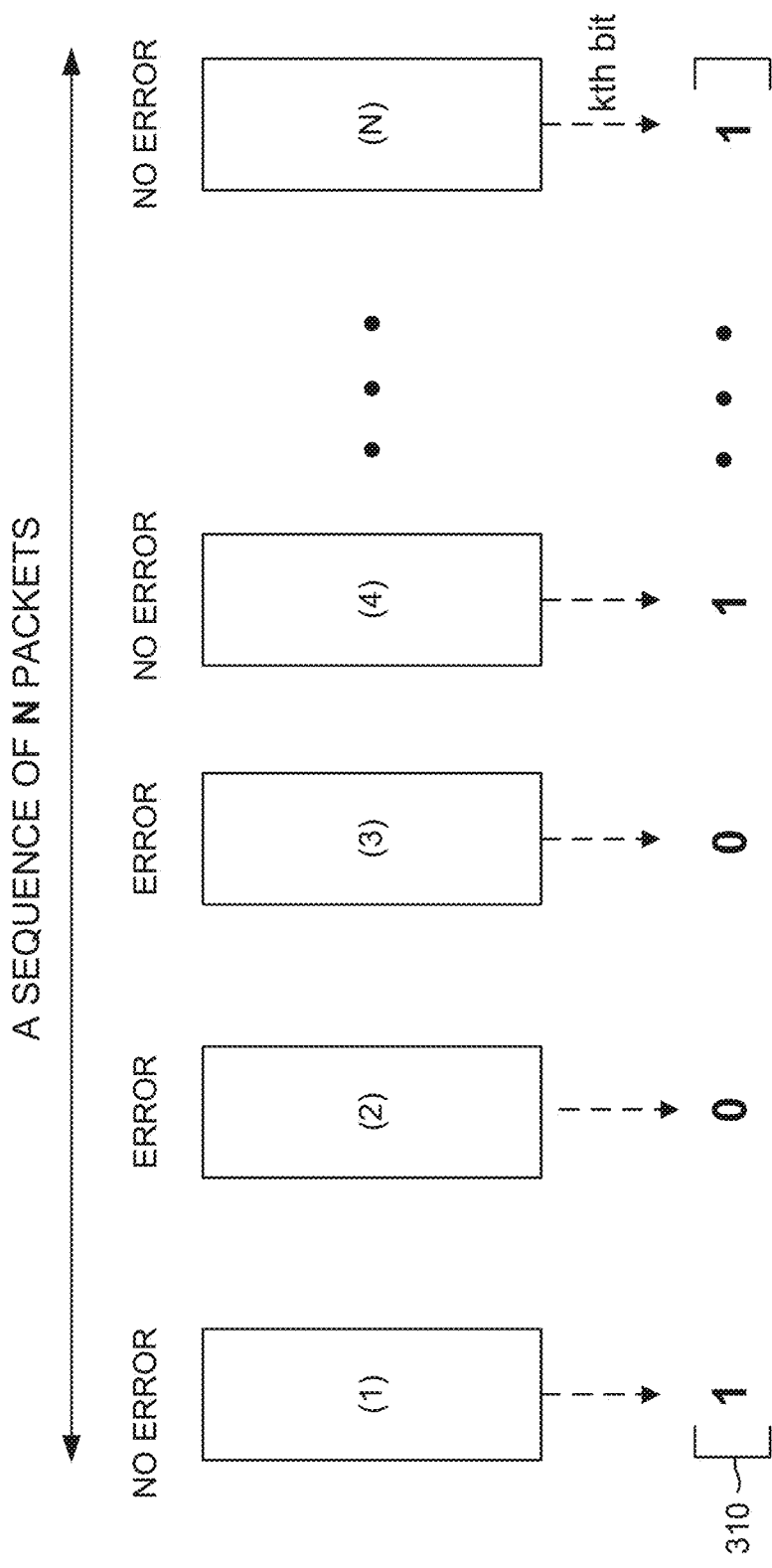
FIG. 4 illustrates graphically an error bitmap vector corresponding to a sequence of transmitted packets, in accordance with some embodiments.

FIG. 4 illustrates graphically an example error bitmap vector corresponding to a sequence of packets transmitted from a master node and received at a slave node, in accordance with some embodiments. More specifically, FIG. 4 shows a sequence of N packets (e.g., UDP packets), indexed from 1 to N, that may be transmitted from the master node. Certain packets (e.g., packets with indices of (1), (4), and (N), as in the example of FIG. 4) may be received at the slave node without error, while other packets (e.g., packets with indices of (2) and (3), as in the example of FIG. 4) may be received at the slave node in error. Accordingly, the slave node may form an error bitmap vector 310 containing k bits, with k'th bit position in the error bitmap vector 302 set to 1 if the corresponding packet is received correctly at the slave node and is set to zero, otherwise. Accordingly, as shown in the example of FIG. 4, the error bitmap vector 310 contains [1, 0, 0, 1, . . . 1] corresponding to respective packets that were received correctly ("1" bits in the vector) and respective packets that were received incorrectly ("0" bits in the vector).

In 306, each of the master node and the slave node independently mixes all the packets that are received correctly at the slave node according to the packet error bit map (e.g., the error bitmap vector) to generate a shared secret. Mixing may be performed, for example, using any suitable cryptographic hash function. In this regard, in some embodiments, if the master node and the slave node have a previously generated shared secret, the mixing may further includes mixing the newly generated shared secret with the shared secret generated earlier, and subsequently using the final outcome or result as the new shared secret to be used for secure communications between the two nodes. Accordingly, in 308, in some embodiments, the shared secret may be used as a password for the device acting as the slave node in accessing the master node, such as a Wi-Fi router. In this regard, as will be described in more detail later, a login name of the slave node may be extracted from a physical signature uniquely identifying the slave node (e.g., a serial number or a MAC address), or may be otherwise negotiated between the master node and the slave node. Further, in some embodiments, the shared secret may be used directly as a symmetric encryption key to encrypt the data exchanged between the master node and the slave node.

Note that, e.g., a typical UDP packet will include a header and a data portion. In illustrative embodiments, mixing of packets that are received correctly involves extracting a data portion (e.g., by discarding a header) of each correctly received packet (where, the data portion may contain K random bits, as noted above with respect to FIG. 3) and mixing (e.g., hashing) the data portions of those packets. Further, as noted above, in illustrative embodiments, each packet will contain random bits, so that the mixing involves mixing random bits from multiple correctly received packets, thus increasing a security of a shared secret generated as a result.

In some embodiments, the example system disclosed herein may be designed such that the probability that an eavesdropper gets access to all the packets that were received error-free and are available (for construction of a shared secret) at two legitimate nodes is extremely small.

As an example, if the probability of packet error is $10^{-1}$, and a number of packets transmitted from a legitimate server node, for example, to a legitimate client node, for example, for establishing of a shared secret is 1000, then the legitimate client node has access to about $1000 \times (1-10^{-1}) = 900$ packets shared error-free with the legitimate server node. Under these circumstances, assuming the probability of packet error rate for eavesdroppers is the same as that of the legitimate link (channel), i.e., $10^{-1}$, the probability that an eavesdropper gains access to all the 900 packets free of error (probability of ~900 success for eavesdropper) is equal to $(1-10^{-1})^{900} \approx 6.58 \cdot 10^{-42}$, which is extremely small. As will be described in more detail, embodiments of the present disclosure provide mechanisms to increase the probability of error for eavesdropper nodes while making sure the legitimate slave node receives an adequate number of packets free of error. To further reduce the probability of success for the eavesdropper, as was described in connection with FIG. 3, some methods disclosed herein include an old (e.g., previous or current) shared secret as an element in the hashing function used to generate the new shared secret from the packets available at the two legitimate nodes. In this manner, the effective number of shared packets used in the generation of a shared secret will be higher as packets involved in the generation of previously shared secrets continue to contribute to the construction of any new shared secret. In this regard, in some embodiments, the "old" shared secret is a shared secret being currently used by the legitimate nodes, prior to the generation of the new (updated) shared secret. As such, each "current used" shared secret may capture the entire past history of shared secrets used by the legitimate nodes.

Further, it will be appreciated that although various methods of the present disclosure are primarily disclosed in terms of using UDP packets for establishing a shared secret, in some embodiments, other network protocols, e.g., TCP, can be used instead of UDP. Generally, when using TCP, the network layer will request its own retransmission until transmitted data is received error-free. Further, in the case of TCP, in some embodiments, the disclosed methods for classifying data packets into two classes (as described above) will be used to select the subset of packets to be used in the generation of the shared secret. In some embodiments, these two classes may be as follows: (1) Class 1: Packets that are received correctly in the first transmission attempt, and (2) Class 2: Packets that are received correctly after more than one transmission attempt. In illustrative embodiments, packets in Class 1 will be used for generating the shared secret.

Figure 5:
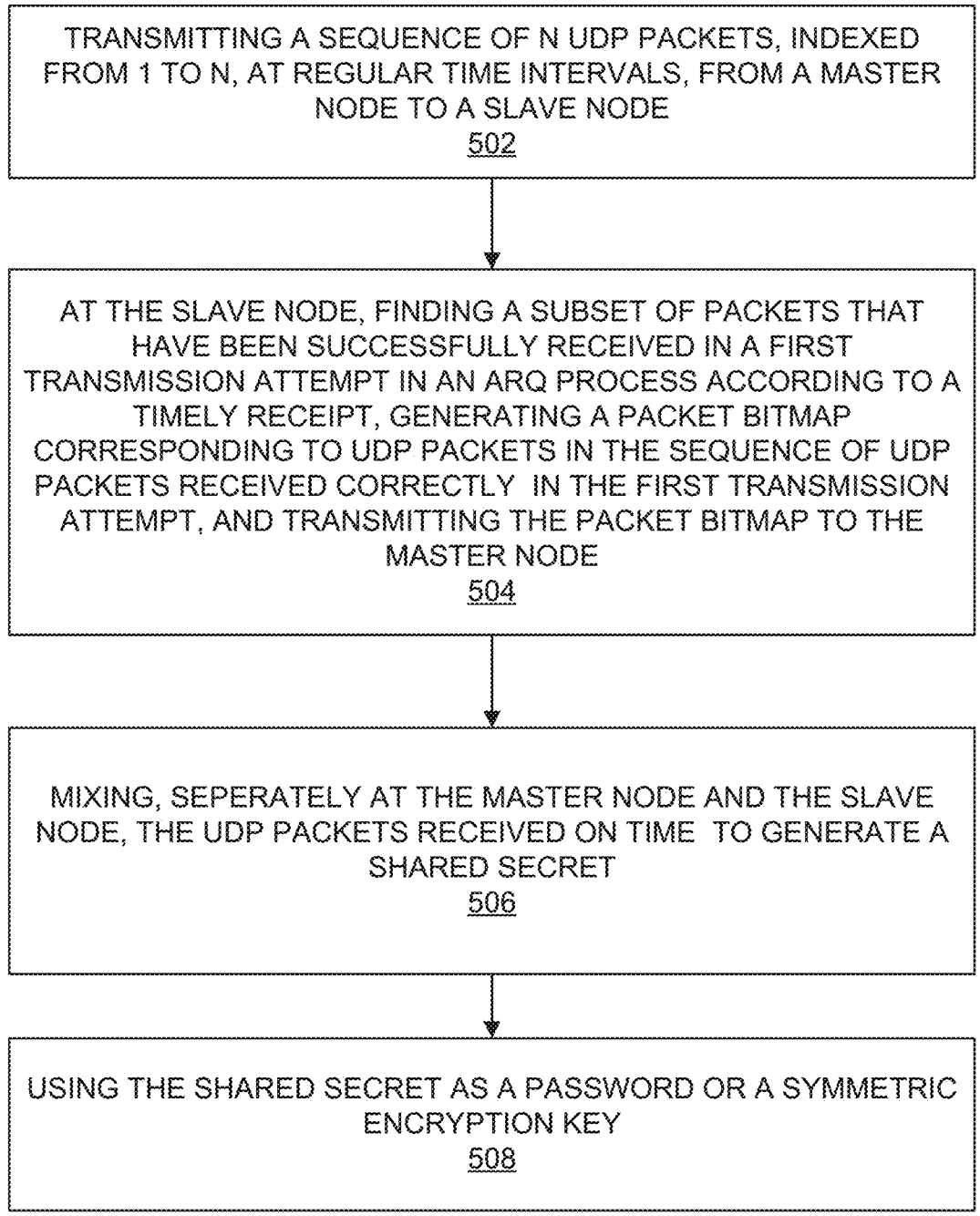
FIG. 5 is a flow chart illustrating an example method for generating a shared secret in scenarios where re-transmission attempts are possible, in accordance with some embodiments.
Figure 6:
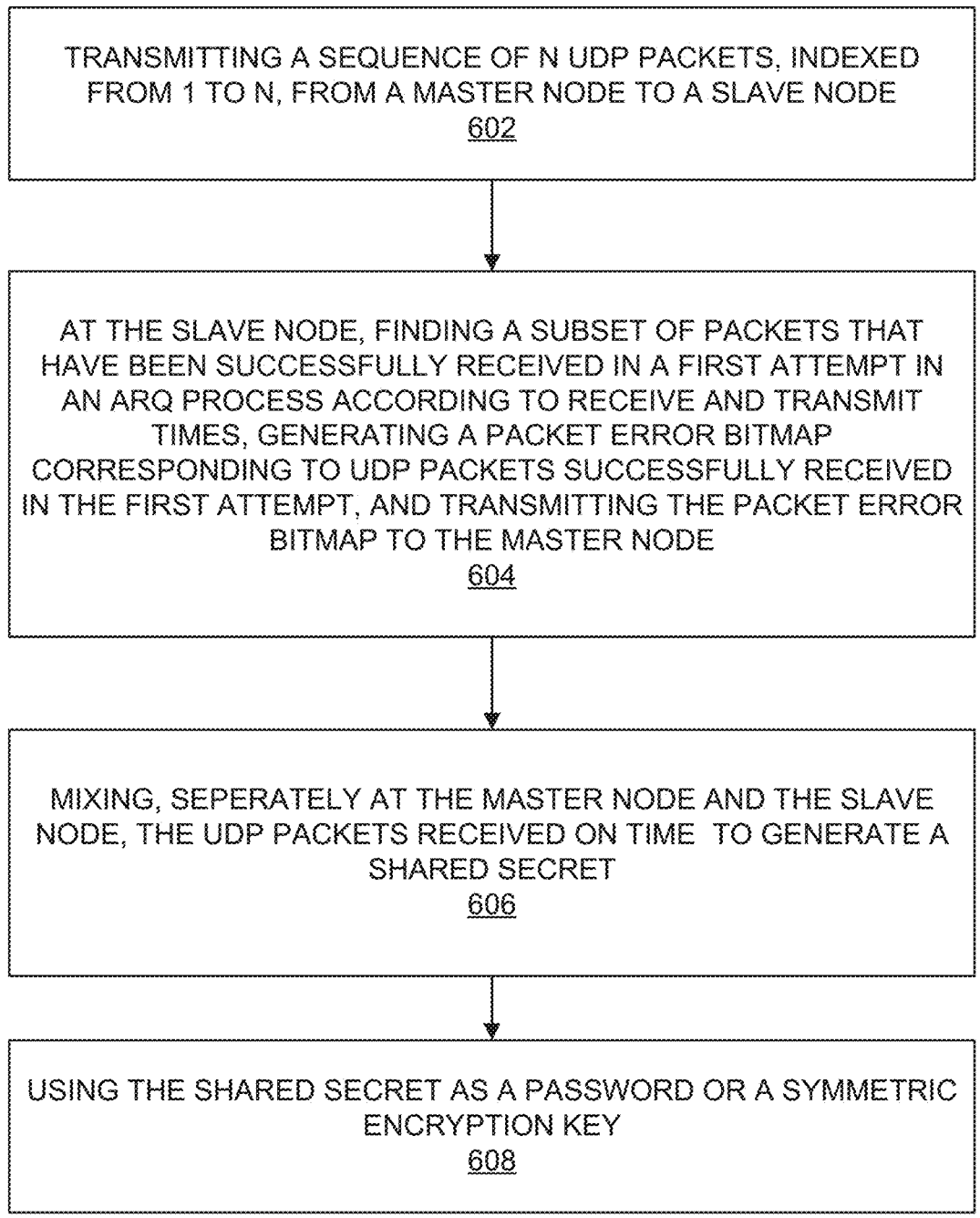
FIG. 6 is a flow chart illustrating another example method 600 for generating a shared secret in scenarios where re-transmission attempts are possible, in accordance with some embodiments.

FIGS. 5 and 6 illustrate example methods that may be employed in scenarios where, for example, a sequence of packets for generation of a shared secret are transmitted using a transport protocol that does not permit disabling, e.g., ARQ at the lower layers (e.g., at the PHY and/or MAC layers as described above) (for example, broadcast or multicast protocols) or, generally, does not permit disabling a re-transmission mechanism of some sort or in which it may not be feasible to do so.

More specifically, FIG. 5 is a flow chart illustrating an example method 500 for generating a shared secret in scenarios where re-transmission attempts are possible, in accordance with some embodiments. In the embodiment of FIG. 5, the method 500 is performed by a master node and a slave node. The method illustrated in FIG. 5 may be suitable, for example, in scenarios in which access to the PHY/MAC layer of a wireless chip (e.g., that of an LTE link) is difficult, and the chip has a built-in ARQ mechanism at the PHY/MAC layer which will function even when, e.g., UDP packets are being exchanged. In such a case, the ARQ is performed by the PHY/MAC layer until the UDP packet is received correctly at a receiving end, or a certain measure of time-out is reached. On the other hand, embodiments of the present disclosure may be added to existing systems through a high-level programming. As a result, the packets passed to a layer where various methods disclosed herein would be executed as an added software will rarely show an error. In this regard, in general, encryption, for example, may be applied at a higher layer, such as an application layer. Accordingly, it is possible to enhance the higher layers through a high-level programming (e.g., programs in C language or Java, among others).

In some embodiments, various methods of the present disclosure including, e.g., a shared secret generation procedure may be implemented via such high-level programming. In some embodiments, high-level programming may provide code to generate a shared key and then pass that key to an existing encryption algorithm (if the shared secret is to be used as an encryption key). In other embodiments, the high-level programming makes it possible to include an encryption algorithm at the application layer in the same program that is configured to generate a shared secret (in accordance with the embodiments of the present disclosure), and use the algorithm to encrypt data with the generated shared key and pass the outcome to the transport layer (where, e.g., the transport layer may add its own legacy encryption, which normally would not interfere with the encryption added at the application layer). To handle such cases without the need to access the PHY/MAC layer of the underlying wireless chip, some embodiments of the present disclosure detect which packets are received in the first transmission attempt, and separate those packets from other packets that have been sent multiple times. Noting that hackers cannot normally request retransmission, the packets that are sent once will have a higher probability of error at an eavesdropper as compared to probability of error of packets that are transmitted multiple times until being received correctly.

Referring now to FIG. 5, in 502, a sequence of N UDP packets is transmitted at regular time intervals, say every 50 msec, from the master node to the slave node. Each packet containing its respective index, and K random bits. In one example, the transmission may occur using a cellular wireless network such as LTE, a Wi-Fi router/access point, or an IoT gateway. Similarly, the slave node may be, e.g., smartphone, laptop, or an IOT sensor node. Then, in 504, by relying, at the slave node, on regularity in the time of transmission for successive packets, a classifier (e.g., implemented in the form of suitable software/hardware) may divide the packets into two classes: a class 1 that contains packets that are successfully received in the first transmission attempt, and a class 2 that contains the rest of the packets. In this regard, in some embodiments, the classifier will (i) determine a subset of packets that are (most likely) to have arrived on time (i.e., have been successfully received in the first attempt in the ARQ due to the MAC/PHY layer of the transmission protocol), generate a packet error bitmap corresponding to the UDP packets in the sequence of the UDP packets received on time (received correctly in the first transmission attempt (class 1 packets)), and (iii) transmit the packet error bitmap to the master node. Note that, in 504, the packet error bitmap may be in the form of an error bitmap vector that is transmitted from the slave node to the master node, informing the master node of the packets that are received in the first transmission attempt. Then, in 506, the packets in class 1 are mixed separately at the slave node and at the master node to construct a shared secret. In 508, the shared secret may be used as a password or a symmetric encryption key.

In some embodiments, the shared secret may be used as a password for the device acting as the slave node in accessing the master node, such as a Wi-Fi router for instance. In this regard, as will be described in more detail later, a login name of the slave node may be extracted from a physical signature uniquely identifying the slave node (e.g., a serial number or a MAC address), or may be otherwise negotiated between the master node and the slave node. Further, in some embodiments, the shared secret may be used (e.g., directly) as a symmetric encryption key to encrypt the data exchanged between the master node and the slave node. This can be a standalone encryption mechanism, or, in some embodiments, may be added as an additional layer of encryption to encryption mechanism(s) already used in the underlying protocol/standard.

FIG. 6 is a flow chart illustrating another example method 600 for generating a shared secret in scenarios where re-transmission attempts are possible, in accordance with some embodiments. Note that the embodiment illustrated in FIG. 6 is generally similar to the embodiment of FIG. 5, but unlike the example method of FIG. 5, UDP packets, transmitted from a master node to a slave node, contain a time-stamp specifying the time each packet has left the master node, in addition to their respective indices and data content made up of random bits.

In 602, the master node (e.g., Wi-Fi router/access point or IoT gateway) transmits a sequence of N UDP packets, indexed from 1 to N, to a slave node (e.g., a computer, a smartphone, or an IoT sensor node). Each packet contains its respective index, time of transmit, and K random bits. In 604, the slave node receives the packets. The received packets may be classified into two classes based on the travel time, a class 1 including packets with shorter travel times (shorter relative to the average travel time) (packets that have most likely been successfully received in the first transmission attempt) and a class 2 including packets with longer travel times. In this regard, the slave node may use receive and transmit times of individual packets received at the slave node to (i) determine a subset of packets that are (most likely) to have arrived on time (i.e., have been successfully received in the first attempt in the ARQ due to the MAC/PHY layer of the transmission protocol), (ii) generate a packet error bitmap corresponding to the UDP packets in the sequence of the UDP packets received on time (received correctly in the first transmission attempt (class 1 packets)), and (iii) transmit the packet error bitmap to the master node. Then, in 606, the UDP packets received on time (according to the bitmap) are mixed separately at the slave node and at the master node to generate the shared secret. In some embodiments, the newly generated shared secret may be mixed together with the shared secret generated earlier (if the shared secret generation has been previously executed by the two nodes), and the outcome of such mixing may be used as the new shared secret.

In 608, the shared secret may be used as a password or a symmetric encryption key. As in the case of the procedure described with respect to FIG. 5, in some embodiments, the shared secret may be used as a password for the device acting as the slave node in accessing the master node, such as a Wi-Fi router for instance. In this regard, as will be described in more detail later, a login name of the slave node may be extracted from a physical signature uniquely identifying the slave node (e.g., a serial number or a MAC address), or may be otherwise negotiated between the master node and the slave node. Further, in some embodiments, the shared secret may be used directly as a symmetric encryption key to encrypt the data exchanged between the master node and the slave node. This can be a standalone encryption mechanism, or, in some embodiments, may be added as an additional layer of encryption to encryption mechanism(s) already used in the underlying protocol/standard.

As noted above, various methods disclosed herein are in terms of establishing a shared secret between two nodes, such as a node acting as a master and a node acting as a slave. In some applications, it will be useful, however, to generate a shared secret between a central node and multiple clients (e.g., between the node 102 and the nodes 104 and 106, as shown in FIG. 1).

In this case, in some embodiments, the central node plays the role of the master node in generating the shared secret. In this regard, the central node may send a sequence of, e.g., UDP packets in broadcast mode to the multiple clients. Each client, in turn, forms its own packet error bitmap, and sends their respective packet error bitmap to the central node. The central node then selects a subset of packets that are received correctly by all of the clients, forms a so-called "composite packet error bitmap", and informs the clients of the indices of the selected packets that have been correctly received by all client nodes by broadcasting the composite packet error bitmap to all clients. Then, each client, as well as the central node, separately (or independently) mixes the packets specified in the composite error bitmap to generate the shared secret. The formation of the composite packet error bitmap may be carried out in a similar manner as described in connection with FIG. 3, where the composite packet error bitmap may be constructed on the basis of a respective error bitmap vector received from each client. Such respective error bitmap vector may be constructed in the same way as described earlier.

To illustrate, in some embodiments, the central node can construct the composite packet error bitmap by examining individual error bitmap vectors received from all of the clients. The individual error bitmap vectors received from all of the clients will indicate the indices of the correctly-received packets by each client. In this regard, the composite packet error bitmap will include "1" bit in position(s) that correspond to "1" in the individual error bitmap vectors for all clients (all clients received a packet with a particular index correctly) and will include "0" bit in all other positions.

Figure 7:
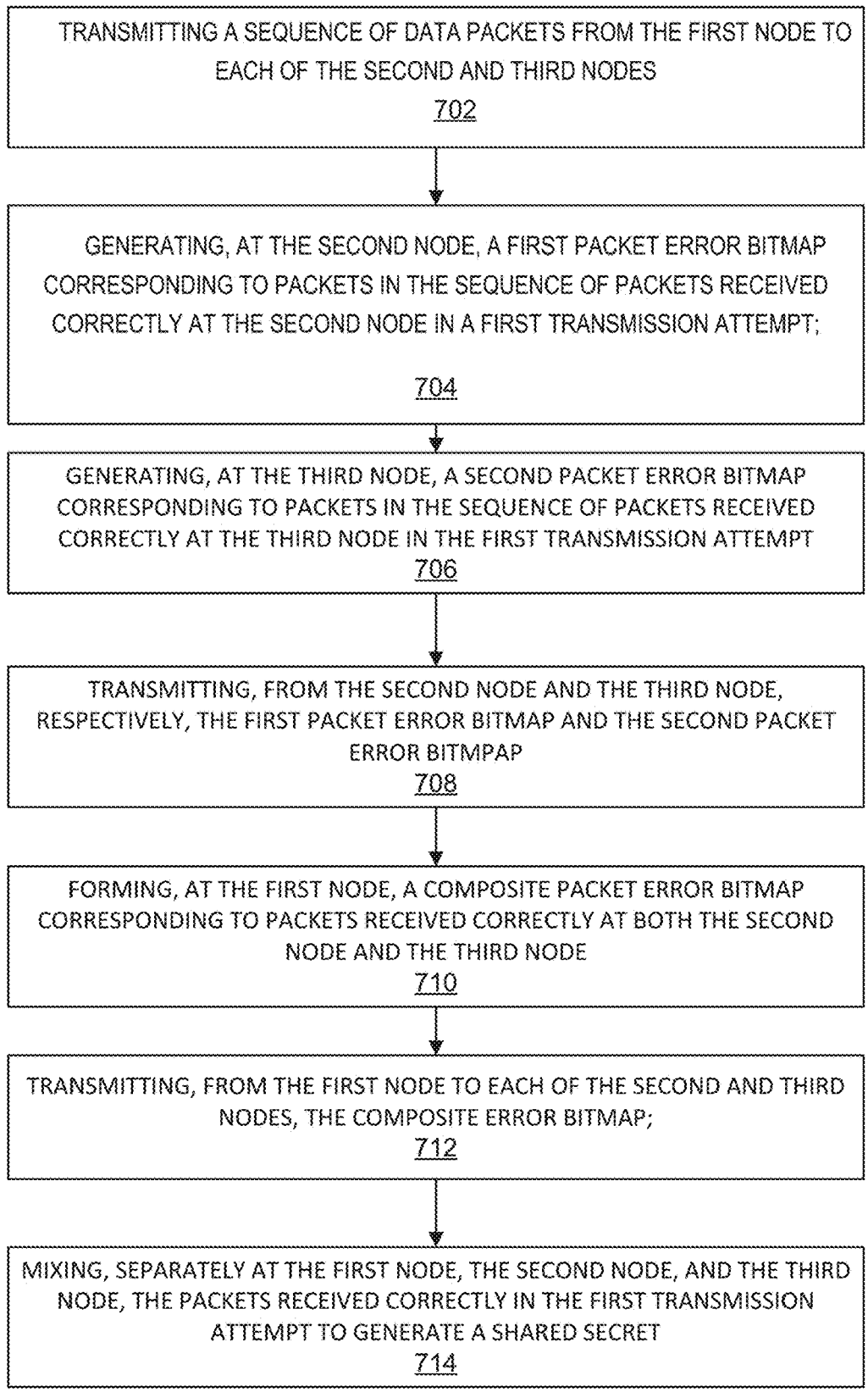
FIG. 7 is a flow chart illustrating a method for generating a shared secret between a first node and at least two other nodes, in accordance with some embodiments.

FIG. 7 is a flow chart illustrating a method 700 for generating a shared secret between a first node and at least two other nodes, in accordance with some embodiments. In an example embodiment, the first node may be a (legitimate) master node, such a wireless router for instance, and the at least two other nodes may be (legitimate) slave nodes, such as client nodes, for instance, served by the wireless router. As shown in FIG. 7, step 702 involves transmitting a sequence of data packets from the first node to each of the second and third nodes. Step 704 involves generating, at the second node, a first packet error bitmap corresponding to packets in the sequence of packets received correctly at the second node in a first transmission attempt, step 706 involves generating, at the third node, a second packet error bitmap corresponding to packets in the sequence of packets received correctly at the third node in the first transmission attempt. Step 708 involves each of the two second and third nodes transmitting the respective packet error bitmap to the first node. Then, step 710 involves the first node forming a composite packet error bitmap corresponding to packets received correctly (free of error) at both the second node and the third node, and at step 712, the first node transmitting the composite error bitmap to each of the second and third nodes. Finally, step 714 involves mixing, separately at the first node, the second node, and the third node, the packets received correctly in the first transmission attempt to generate the shared secret. Accordingly, each of the first node, the second node, and the third node mixes independently (separately) the packets received correctly in the first transmission attempt to generate the shared secret.

In some embodiments, the generated shared secret may be used as an encryption key for secure communications between the first node, the second node, and the third node (e.g., between the first node and each of the second and third nodes, or between the second node and third node). Alternatively, or in addition to, the generated shared secret may be used as a password for authentication between the first node, the second node, and the third node. Additionally, in some embodiments, if a previously generated (and, e.g., currently used) shared secret already exists, that previously generated (or current) shared secret may be further mixed with the newly generated shared secret, as explained above.

In some embodiments, the first node (e.g., a central node) may be a Wi-Fi router operating in a residential modes. In such case, a Wi-Fi password for the residential mode may be the same password for the entire network. As such, the generated shared secret may be used as a shared password by each client node when connecting to the router in the residential mode. With such shared password, the client nodes can login to the Wi-Fi router, and in accordance with Wi-Fi standards, the encryption key may be generated from this shared password. Note that this embodiment may be applicable to Wi-Fi routers operating in an ad-hoc networking mode, since in such network, client devices normally communicate with each other and also communicate with a central router. Hence, the generated shared secret may be used as a shared password in both types of Wi-Fi networks.

As another example, in some embodiments, consider an IOT network with sensor nodes that talk (communicate) with each other and also talk with an IOT gateway. The generated shared secret may be used as a shared password to authenticate both of these types of connections ("sensor node to sensor node" and "sensor node to IOT gateway" connections), and/or it may also be used as an encryption key once respective links are authenticated and established.

In general, WLAN based on the 802.11/Wi-Fi standard is one of the most widely used communications technologies. WLAN is typically responsible for a major portion of successful password hackings. Due to the significance of WLAN and its vulnerability to hacking, the remaining portions of the present disclosure will primarily explain and illustrate various embodiments in the context of 802.11/Wi-Fi standard. The 802.11/Wi-Fi standard supports (data) broadcasting, which, in some embodiments, is well suited for use in connection with various methods disclosed herein. Accordingly, in some embodiments, methods of the present disclosure enhance Wi-Fi security by making it harder for hackers to gain access to shared secrets, such as users' passwords for instance.

In general, Wi-Fi access points (also often called routers, as indicated hereinbefore), and accordingly Wi-Fi clients, operate in one of two modes: a "residential mode" and an "enterprise mode". Residential mode, which is typically used in homes and small offices, relies on a single password such that the same password is used for all clients connecting to a residential Wi-Fi access point (router). This password remains the same until the administrator (admin) decides to change it. The shortcomings of traditional residential Wi-Fi are listed below.

If a hacker gains access to the shared password, it essentially means the privacy/security of all clients is compromised.

Passwords for residential Wi-Fi routers are typically rarely changed because the administrator needs to manually access the router, register as "admin", and change the password. Even if the administrator is cautious and periodically changes the shared password, the change needs to be propagated to all clients' devices, which is not convenient.

Passwords for residential Wi-Fi routers are typically selected by non-experts, and for this reason, are usually too short and are selected to be easy to remember. In the language of Information Theory, a password selected in this manner contains redundancy and, as a result, is much easier to hack. In authentication, a hash of the password is used instead of the raw password, and hackers first gain access to this hashed version of the password which they need to reverse engineer to extract the password in plain text. Hackers may reduce the search space in conducting an exhaustive search that aims to extract the password from its hashed version, in particular by relying on a dictionary attack.

For the enterprise Wi-Fi, each client has his/her own password, and a hashed version of all passwords are stored in an authentication server (for example, in a Radius server). The shortcomings of traditional enterprise Wi-Fi are listed below. Passwords are all stored in one server, and the server itself is prone to hacking. As a result, if the server is hacked, it will have far-reaching consequences.

Individuals managing the server have access to all passwords and may decide to abuse their access, or even unintentionally (e.g., just by being careless) facilitate the hacking for external hackers. Further, although in the enterprise mode each client has a separate password, clients rarely change their passwords, consequently, if a password is compromised, it will create an open door for hackers to access the enterprise internal network. As the compromised password is likely to remain the same, the hacked door will remain open for a long time, and hackers may cause extensive damage due to having a lengthy period of continual access to the enterprise internal network.

Some embodiments disclosed herein solve the above shortcomings. Some embodiments include a method including a router that operates in a composite mode that is a combination of "residential" and "enterprise" modes. The router is equipped with a shared password for its operation in the residential mode, and then each device connecting to the router has its own unique login-name and password for operation in the enterprise mode. Each of these two modes creates a Password-protected Gate (PG). The PG for the residential mode is specified by PGR, and the PG for the enterprise mode is specified by PGE. The PGR is the first gate, which should be opened first using the shared password and then comes the second gate, which is PGE, and the PGE is opened by the particular device used by the client sending its unique login-name and password as if a client is accessing an enterprise Wi-Fi network. Assigning a login-name and password for devices has the advantage (in comparison with individual people having login-names/passwords) that devices can store a longer and more sophisticated password, and more importantly, the passwords assigned to devices can be changed over time in an automated manner. In some embodiments, methods of the present disclosure for secret sharing are used to change the passwords used by the devices in an automated manner.

In one embodiment, the router has two modes, a "normal mode" in which only the residential mode is active, and this "normal mode" is used to service devices with low-security requirements, such as the guest network supported by the router, or an entertainment unit with low-security implications. This mode will be also used to introduce new devices (register new devices) to the second mode (enterprise mode). The second mode is used to authenticate clients' devices for clients that require a higher level of security. In the second mode, first, the client is authenticated through PGR using traditional Wi-Fi residential password authentication. Then, the router, knowing that the particular device is set to use the higher level of security will interact with the device and initiate a procedure as if a client is being authenticated in an enterprise Wi-Fi environment. This means the client device will send its login name and then its password to the router to be compared with the authentication credentials associated with that particular device. Finally, the client is authenticated if both authentications are successful. In some embodiments, the router will hold a list of client devices set to use the higher security mode (enterprise mode). For example, in an initial setup phase, each new client device that plans to use the more secure mode within the router (e.g., use a radio operating in the Wi-Fi enterprise mode) is registered at the router. During such registration, as will described later, the router may store login name/password credentials of a particular client device being registered. The router may have an internal database that stores the list of all the devices set for communication in the enterprise mode (e.g., in the form of their respective login names and passwords).

Some embodiments of the above method may include using any suitable static attribute of the device as its login name (or, login name, as used herein in places), for example and without limitations, a MAC address, a Bluetooth address, a serial number, etc. If the format (e.g., the length or ASCII characters) of the attribute to be used as the login-name does not match the requirements associated to enterprise Wi-Fi, techniques including hashing, truncation, "substitution of characters using a pre-generated/pre-stored look-up table may be deployed to convert the login-name to a desired format. In the case of using a pre-generated/pre-stored look-up table. In some embodiments, the pre-generated/pre-stored look-up table is available at both the client device and the router. In an example, such pre-generated/pre-stored look-up table may be configured in software (e.g., an application program) executed on the router and the client device.

Client devices using a higher level of secure authentication may install a program, which, in some embodiments, may be sent by the router to the client device or may be downloaded from a website in accordance with instructions or directives from the router. The procedure for downloading and installing the program on the client device may be initiated by the router by instructing the client (using, e.g., messages that appear on the screen of the client device for a display to a user of the device) or directly by the user upon referring to the routers instruction set, such as during an initial router setup for instance.

Further, in some embodiments, each router may have a built-in web-site for administration purposes, such as changing a password. The program to be installed on the client may be available for download from the Internet website or on the web-site internal to the router itself. As such, as a part of the initial setup, the program may be downloaded onto the client device and installed.

Further, some embodiments may include automatically generating a password for each particular device and automatically changing (updating) the password such that any given password has a relatively short life-span. This is explained in more detail below.

To generate the password, a random sequence (shared secret) is generated between the router and the client device using the method disclosed herein. This is achieved without disclosing any information about its content to eavesdroppers who may be monitoring the exchange of data over the air. As described above, in some embodiments, the shared secret generation may be carried out, for example, in accordance with the methods of FIGS. 2 and 3, as well as other methods disclosed herein. Some embodiments, explained below, share such a random string between the router and the client device.

At the router side, in some embodiments, a sequence of, for example, UDP packets containing random data is generated, and UDP packets are transmitted, such as in the broadcast mode, to the client device. In general, each UDP packet has a mechanism for error checking. More specifically, typically, in Wi-Fi, packets are automatically equipped with an error detection mechanism, which is automatically used to detect erroneous packets and drop them before being passed to the network layer at a receiving device. In dealing with wireless standards/protocols that do not support such a built-in error detection capability, in some embodiments, error detection capability can be added to raw data to be transmitted to the client device by incorporating an error checking mechanism, for example using Cyclic Redundancy Check (CRC).

Upon reception by the client device of the packets, the client device measures the packet error rate of the set of transmitted UDP packets. If the packet error rate is lower than a threshold "TE" (Target Error) specifying a target (packet) error rate, the client device reports the error rate to the router, and accordingly, router reduces its transmit power and/or increases its modulation index (to higher rates in the underlying adaptive coding and modulation used in Wi-Fi) with the goal of meeting the target packet error rate of TE. In an illustrative embodiment, this measurement/feedback/adjustment operation is repeated until the target packet error rate of TE is (approximately) achieved. If it turns out that the target error rate may not be reached, then, in some embodiments, the procedure is delayed to a later time. In some other embodiments, the router is configured to transmit, for example, at a power level lower than a threshold P and/or its modulation index is higher than a threshold MI. Meeting these conditions may ensure that possible eavesdropper(s) observe an error rate comparable with, or higher than, the client device.

In another embodiment, the router is equipped with a beamforming antenna and, in order to provide a higher Signal-to-Noise Ratio (SNR) for the client device, the router focuses its beam on the client device. The beamforming (weight) coefficients are adjusted relying, for example, on the UDP packets and selecting the antenna beam pattern based on the packet error rate corresponding to different antenna patterns. The objective is to select the pattern that meets the threshold on the packet error rate for the client device, at the lowest level of transmit energy and the highest level of modulation index. Here, in some embodiments, the client device may be configured to report the observed packet error rate to the router and the router may be configured to adjust the antenna beam pattern (by, e.g., adjusting beamforming weight coefficients) until that the threshold for the packet error rate at the client device is met.

As described above, some embodiments utilize a power reduction at the router in an effort to achieve the target packet error rate according to the threshold TE. Note that Wi-Fi routers typically have a range for the adjustment of their transmit power, so that typically the power may not be reduced to values lower than 0 dBm. In one embodiment, a router design may be configured accordingly to add a tunable attenuator prior to its antenna. As an example, the routers RF front-end may be modified to include the tunable attenuator prior to the antenna. Then, in some embodiments, after receiving reports from the client device concerning the measured packet error rate at the client device, the router will be configured to generate a control instruction to the tunable attenuator to adjust its attenuation level until the target error rate is met.

In some embodiments, the router is further equipped with two Wi-Fi radios, one radio operating at 2.4 Ghz and equipped with, e.g., a single antenna (e.g., a radio operating according to IEEE 802.11g) to be used for the transmission of UDP packets used in establishing a shared password. The second Wi-Fi radio may be more advanced so that it can support, for instance, more variations of the Wi-Fi standards, such as IEEE 802.11n and IEEE 802.11AC, and support a greater number of operating frequency bands, such as, e.g., both the 2.4 Ghz band and the 5 Ghz band. For example, the IEEE802.11g radio that is responsible for establishing the shared password, may be also used to support clients' access at times that it is not used for its main purpose (establishing the shared password). In other words, one radio that is dedicated to tasks associated with generating a shared secret may also serve additional functions, such as providing normal Wi-Fi connections to client devices.

In all above techniques, according to some embodiments, an interactive algorithm, relying on feedback from the client device, may be used if necessary to adjust various parameters (such as transmit power and/or modulation index) such that the target error rate is met, while making sure that the chance or likelihood that an eavesdropper receives the packets with a significantly lower error rate as compared to that of the client device (legitimate receiver node) is reduced (e.g., minimized).

In case the operation for generating the shared secret, as described above, is unsuccessful (e.g. ideal conditions for packet error rate cannot be reached), according to some embodiments, one (or a combination) of the following example strategies may be deployed, as listed below.

In one example, the operation is delayed to a later time when the client device is in a better channel condition (this is applicable if at the power level P (as described above) and the modulation index IM (as described above), the observed error rate at the legitimate slave node is too high).

In another example, a message appears on a screen of the client device to move closer to the router (this is, e.g., applicable if at the power level P and the modulation index IM, the observed error rate at the legitimate slave node is too high).

In another example, the router switches to a Wi-Fi band with higher interference (e.g., if the router is equipped with multiple radios, as in certain embodiments described above, that operate within different frequency bands) to help achieve the target packet error rate at the client device.

In another example, the router may be equipped with an internal radio source that is configured to introduce noise into an intended transmit signal and is activated to transmit such noise (interference) over the air. For example: (1) the router activates an internal (auxiliary) generic transmitter sending noise over the same band as that used by the client device, (2) the router has an auxiliary Wi-Fi transmitter and activates that auxiliary transmitter to send random data in the same Wi-Fi band that is being used by the router, and/or (3) the router has an auxiliary Bluetooth transmitter and activates the Bluetooth transmitter to send random data to act as interference (noise). It will be appreciated that other techniques of configuring an internal noise generation source may be used as well.

In yet another example, the number of UDP packets transmitted by the router is increased and accordingly, the threshold T is decreased. Other example strategies may be deployed as well.

To summarize, an example method, in accordance with some embodiments, may include: adjusting iteratively a power level (and/or modulation index) to reach a target packet error rate for UDP packets exchanged between a router and a client device; transmitting a sequence of UDP packets (such as, in in broadcast mode, for example), from the router to the client device; generating a packet error bitmap corresponding to the UDP packets in the sequence of UDP packets received correctly; the client device transmitting the error bitmap to the router; and each of the router and client device independently mixing the UDP packets received correctly to generate a shared secret, such as a shared password.

In some embodiments, when the client device has reached to the target packet error rate, it will record the indices of the packets that are received in error, form a word W of N bits where N is the number of UDP packets used in the final transmission of UDP packets in which that the target packet error rate was met, the "k"th bit position in this word corresponds to the "k" th UDP packet, and it will be set to zero if the corresponding packet has been received in error, and set to one if the corresponding packet has been received without error.

Upon the word formation, to further improve security, the bit positions in the word W may be permuted using a permutation that is derived at both ends (the router and the client device). The procedure to generate such a permutation is designed such that both ends will reach to the same permutation. In a preferred embodiment, the Knuth shuffle algorithm is used to generate a pseudo-random permutation. In an illustrative embodiment, the very first time the device connects to the router, the two ends rely on the device login-name to generate the permutation, and in the following rounds of authentication, the two ends derive the structure of the permutation from the current password of the device. This is to make sure the permutation changes in each round of establishing a new shared password.

Then, the client device sends the permuted version of the word W to the router, and the router first reverses the effect of permutation. Noting the outcome, routers will know which of the UPD packets are received correctly at the client device. Note that this information will be available at both ends.

Knowing the indices of the UPD packets that are correctly received by the client device, the router and the client device may proceed to mix the contents of these UPD packets. The procedure used for mixing will be the same at the two ends (client device and the router), and is conducted separately at each of the two ends. Examples of mixing operation include: (1) Bit-wise XOR of the packets that are received correctly, (2) hashing using a hash function to mix the contents of the UDP packets that are received correctly, or (3) Bit-wise XOR of the packets that are received correctly, followed by using a hash function to mix the first half of the result of the Bit-wise XOR with its second half.

To summarize, according to some embodiments, an example may include: adjusting iteratively a power level (and/or modulation index) to reach a target packet error rate for UDP packets exchanged between a router and a client device; transmitting a sequence of UDP packets (e.g., in a broadcast mode) from the router to the client device; generating a packet error bitmap corresponding to the UDP packets in the sequence of UDP packets received correctly; permuting the packet error bitmap using a Knuth shuffle algorithm which is initialized using a seed extracted from earlier shared secrets to generate a permuted packet error bitmap; the client device transmitting the permuted error bitmap to the router; the router reversing the effect of the permutation; and the router and the client device independently mixing the UDP packets received correctly to generate a shared secret. In some embodiments, the shared secret is used as a password for the client device in accessing a Wi-Fi router operating in the enterprise mode, while a signature, e.g., a serial number or a MAC address, of the client device is used as the login name for the client device in an enterprise mode.

Further, in some embodiments, the outcome or result of mixing the contents of the UPD packets described above is mixed with the old (e.g. previous) password and/or mixed with the device's login-name. The mixing with the client device device's login-name may be carried out if, for example, it is the first time a password is being established (e.g., a new device is being registered).

Finally, as described above, if the format of the outcome of mixing with the old password and/or with the device's login name (e.g., length or use of ASCII characters) of the attribute to be used as the password does not match the requirements associated with password format in enterprise Wi-Fi, various techniques including hashing, truncation, "substitution of characters using a pre-generated/pre-stored look-up table" may be deployed to convert the login-name to an acceptable format.

Figure 8:
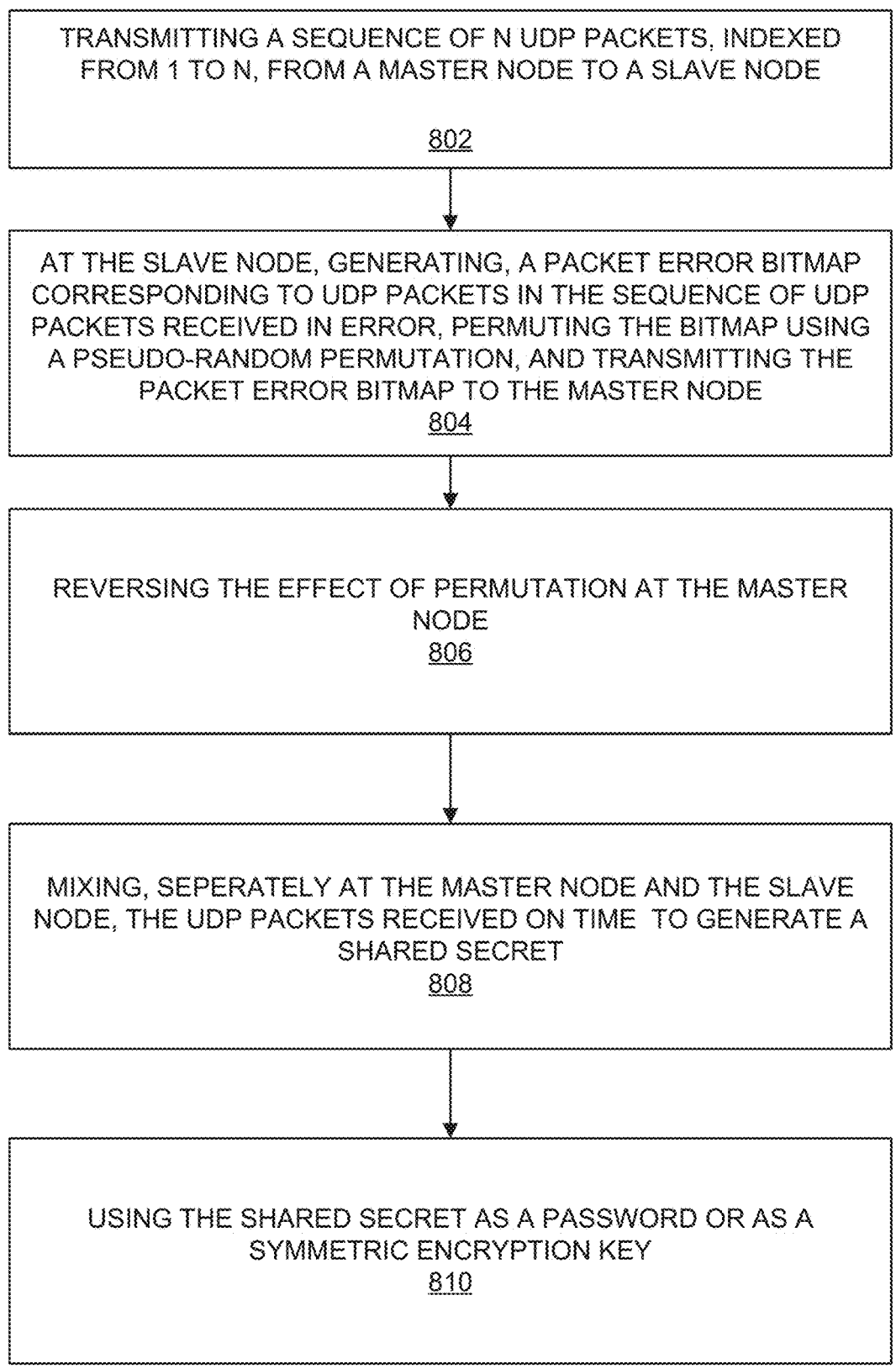
FIG. 8 is another flowchart illustrating an example process for generating a shared secret that involves bit position permutation, according to some embodiments.

FIG. 8 is another flowchart illustrating an example method 800 for generating a shared secret that involves bit position permutation, according to some embodiments. Note that the difference between the method of FIG. 8 vs. and, for example, the method of FIG. 3 is that, in the case of FIG. 3, bit positions in an error bitmap vector are permuted before being sent to a master node.

In 802, the master node (e.g., a Wi-Fi router/access point or an IoT gateway) transmits a sequence of N UDP packets, indexed from 1 to N, to a slave node (e.g., a computer, a smartphone, or an IoT sensor node). Each packet contains its respective index and K random bits. In 804, the slave node (i) generates a packet error bitmap corresponding to the UDP packets in the sequence of the UDP packets received in error, (ii) permutes the bitmap using a pseudo-random permutation, which is generated based on a seed value available to both the master node and the slave node, and (iii) transmits the packet error bitmap to the master node. As noted, In some embodiments, the permutation operation is generated pseudo-randomly, such as using Knuth permutation for instance, using a seed value that is available at both a slave node and the master node. The seed value may be extracted from a current shared secret or determined in a different way, for example by using the current time, if no previous shared secret exists yet. The permuted error bitmap vector may be transmitted to the master node from the slave node, such over a secure channel (for example, a channel encrypted using previously generated shared secret). Subsequently, in 806, the master node reverses the permutation, and then in 808, the master node and the slave node, separately, mix all the packets that are received correctly at the slave node (according to the error bitmap vector). Mixing may be performed, for example, using a cryptographic hash function. Further, in some embodiments, the newly generated shared secret may be mixed together with the shared secret generated earlier (if the shared secret generation has been previously executed by the two nodes), and the outcome of such mixing may be used as the new shared secret.

Finally, in 810, the shared secret may be used as a password for a device functioning as the slave node to access the master node, with a login name, e.g., extracted from a physical signature within the slave node (e.g., a serial number or a MAC address), or otherwise negotiated between the master node and the slave node. Alternatively, the shared secret may be used (e.g., directly) as a symmetric encryption key to encrypt the data exchanged between the master node and the slave node.

In some embodiments, the establishing of the shared secret (as illustrated in FIG. 8) is repeated over time in order to update the shared secret. In such embodiments, the packets received correctly at the slave node may be mixed with each other and also mixed with the current shared secret to construct the new shared secret. As noted above, the seed value, for example, may be extracted from the current shared secret.

As discussed hereinbefore, a shared secret may be updated over time, further increasing its security. In addition, previously-generated shared secrets may also be used in generation of a new shared secret, thus increasing a complexity of the new shared secret.

Figure 9A:
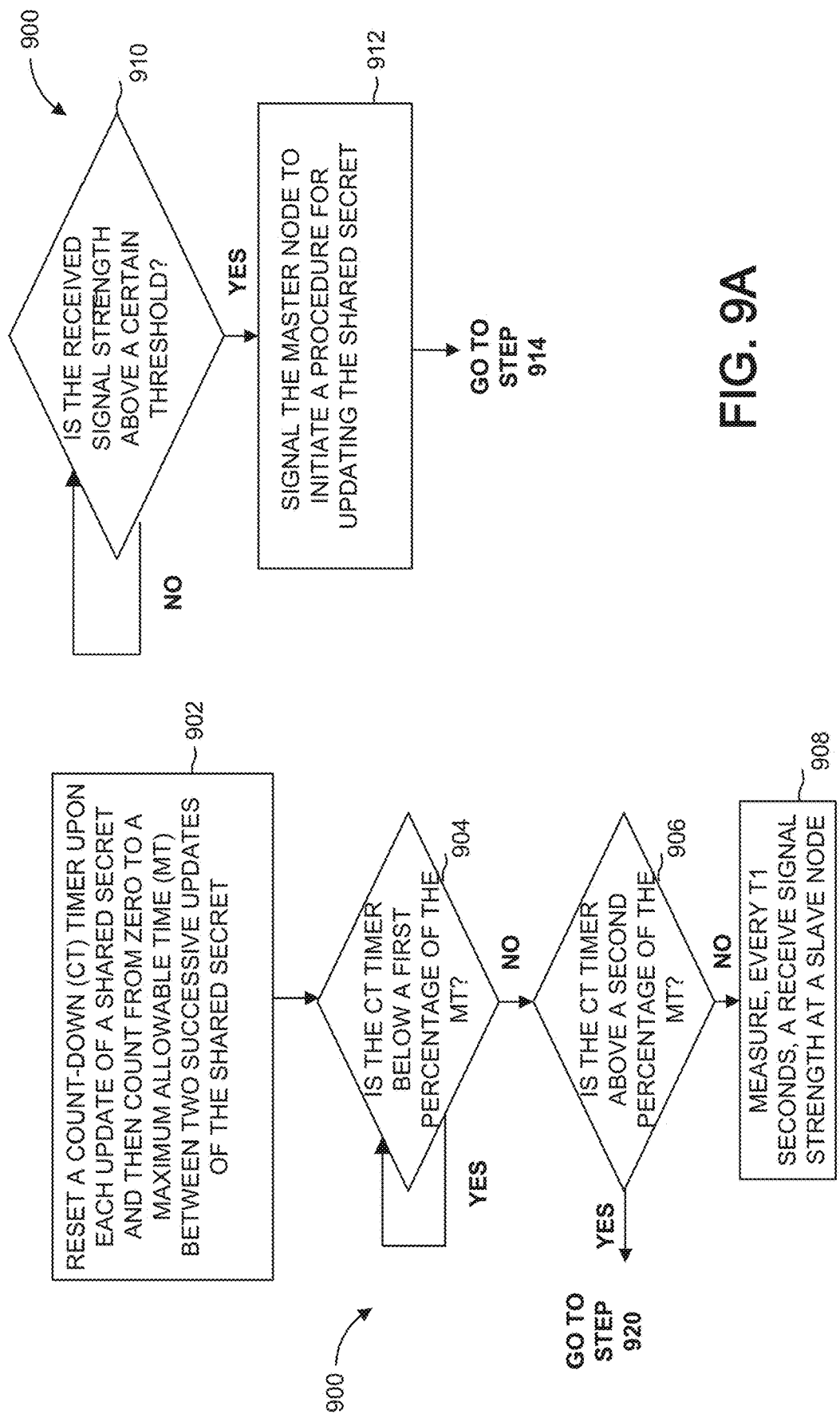
FIGS. 9A and 9B is flowchart illustrating an example method for determining time and conditions under which to renew a shared secret, according to some embodiments.
Figure 9B:
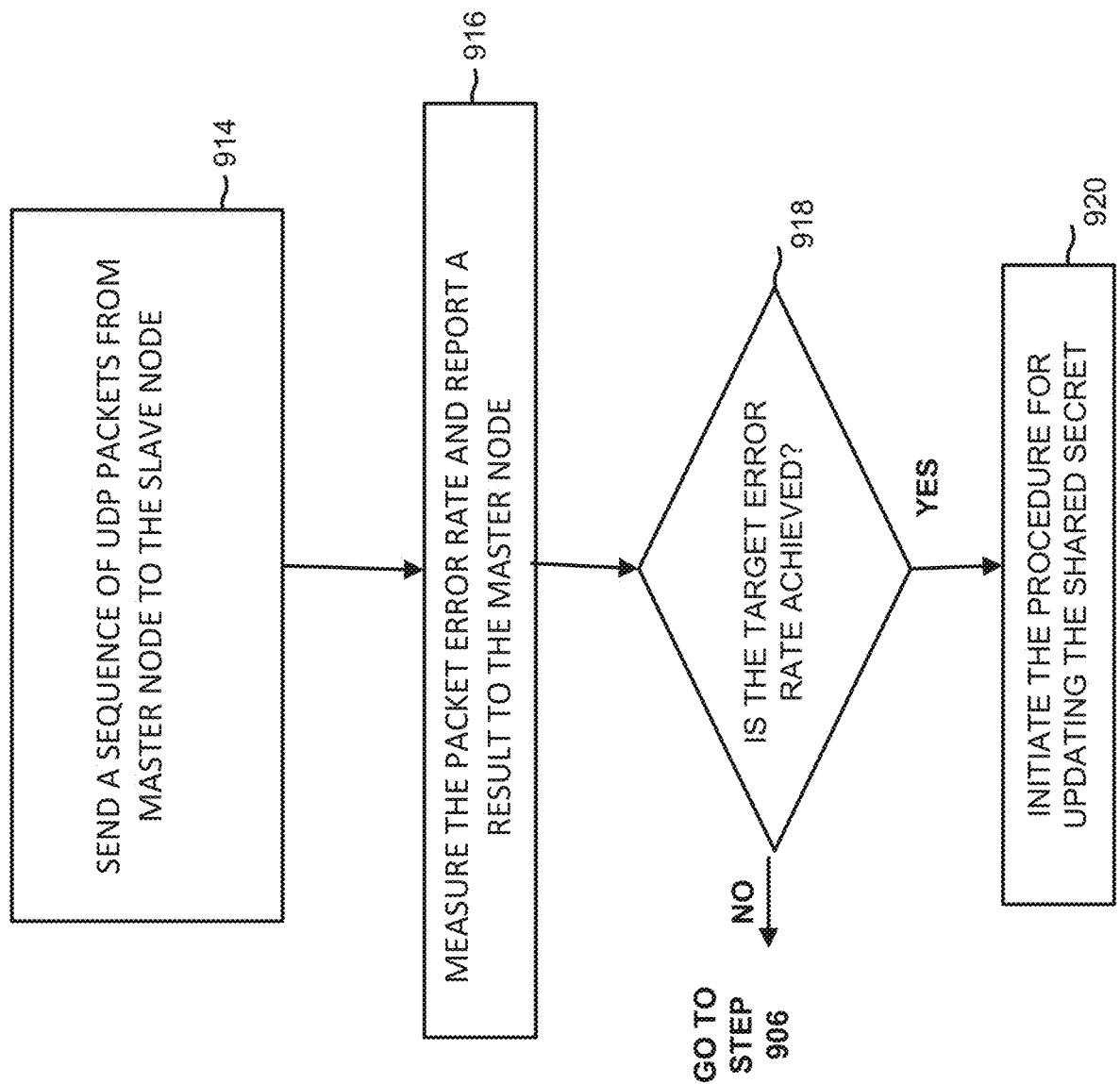

FIGS. 9A and 9B are flowcharts illustrating an example method 900 for determining time and conditions under which to renew a shared secret, according to some embodiments. In the embodiment of FIG. 9, a count-down timer is used to monitor a time between two successive updates of the shared secret. According to the present embodiment, there is a maximum allowable time by which the shared secret should be renewed. As such, the shared secret essentially has a maximum lifetime. Further, in the example method illustrated in FIG. 9, a master/central node, such as a wireless router (or other device acting engaging in secure communications with slave/client nodes), may be configured to trigger a shared secret renewal/update procedure.

More particularly, in 902, a count-down (CT) timer is reset upon each update of the shared secret. In this regard, and the CT timer is configured to count from zero to a time representing a maximum allowable time (MT) between two successive updates of the shared secret. In 904, a check is made as to whether the CT timer is below a first percentage, say, e.g., 1%, of the MT. The check is made to ensure that the shared secret is not updated too early, with the percentage set such that it indicates that the updating of shared secret has been recently performed and there is no need for any update at this point in time. In some embodiments, in addition to time, some other factors may be included in the decision to start the update process. Such other conditions may consider a state of the channel between the master node and a slave node, such as on the basis of a signal strength (with, e.g., a high signal strength being indicative of a favorable channel conditions). At the same time, the modulation index and a transmit power may be adjusted, e.g., in the manner described hereinbefore, to increase the packet error rate for all receivers, including any potential eavesdropper. If the CT timer exceeds the first percentage, the process proceeds to 906.

In 906, a check is made as to whether the timer CT is above a second percentage, say, e.g., 2%, of the MT, thus indicating that the update of the shared secret is approaching its maximum allowable time since a previous update of the shared secret. If the CT timer is approaching the limit of the maximum allowable lifetime for the current shared secret, then the process proceeds to step 918 (shown in FIG. 9B) in which the update procedure is initiated. Otherwise, the process continues to 908 where the signal strength of the channel between the master node and the slave node is monitored on a regular basis (e.g., periodically in time). As shown in the example method, a receive signal strength may be measured every T1 seconds at the slave node to check, in 910, whether the receive signal strength is above a certain pre-defined threshold indicative of a relatively good reception (low error rate) at a current location/condition of the slave node. This examination of the channel condition at the slave node continues until a relatively good channel condition is reached, and then the method moves to 912, in which the slave node signals the master node to initiate the update procedure of the shared secret.

At 914, the channel between the master node and the slave node is first examined in a closed-loop manner until the lowest level of transmit power and the highest level of modulation index is reached for which the packet error rate at the slave node is high enough (e.g., meets a certain threshold). This may guarantee that the packet error rate for any eavesdropping receiver is likely to be high (as, e.g., in the embodiments described hereinbefore). More specifically, at 914, the master node sends a sequence of packets (e.g., UDP packets) to the slave node to measure the packet error rate, and report back the result to the master node (916). In summary, the update process of the shared secret generally occurs when the channel condition for the link between the master node and the slave node is relatively good, while the parameters governing achievable packet error rate to any receiver (in this case particular example, the transmit power and the modulation index) are selected to increase the packet error rate as much as possible. If, at 918, the master node determines that the target packet error rate has been achieved at the slave node, the method proceeds to 920, at which the procedure for updating the shared secret is initiated. To achieve the target packet error rate, the master node may lower its transmit power and/or select a higher modulation index until the target error rate at the slave node is met. As an example, the target packet error rate may be between 20% to 50%. If not, the procedure returns to step 906.

Figure 10:
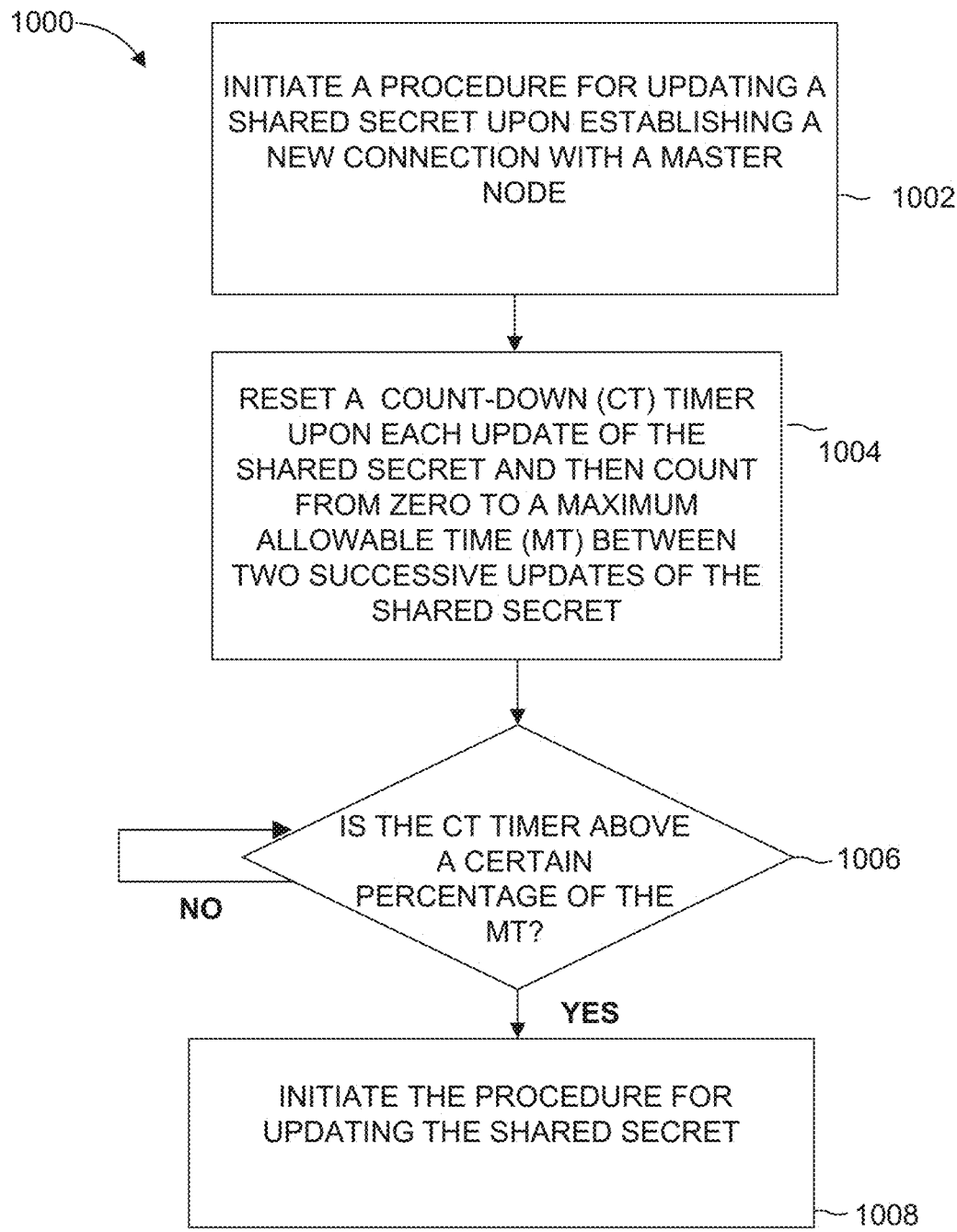
FIG. 10 is a flow chart illustrating another example method 1000 for determining time when to renew a shared secret, according to some embodiments.

FIG. 10 is a flow chart illustrating another example method 900 for determining time when to renew a shared secret, according to some embodiments. Note that the embodiment illustrated in FIG. 10 is generally similar to the embodiment of FIG. 9, but unlike the example method of FIG. 9, only a timing limitation is checked before starting an update procedure of the shared secret. In the example method illustrated in FIG. 9, a master/central node, such as a wireless router (or other device acting engaging in secure communications with slave/client nodes), may be configured to trigger a shared secret renewal/update procedure.

At 1002, the procedure for updating the shared secret is initiated upon establishing a (e.g., any) new connection with a master node. In some embodiments, the update procedure is initiated with each new connection to the master node, such when, e.g., a particular slave node has previously established a shared secret with the master mode, the connection was terminated for any reason, and the slave node is establishing a new connection (reconnecting) to the master node (e.g., a Wi-Fi router. In this case, the last used password may be used for establishing an initial communication with the router and the procedure for updating the shared secret is initiated upon establishing a connection. At 1004, a count-down (CT) timer is reset upon each update of the shared secret. In this regard, and the CT timer is configured to count from zero to a time representing a maximum allowable time (MT) between two successive updates of the shared secret. Here, the check is made as to the time passed since the last update versus the allowable lifetime of the shared secret. At 1006, the CT timer is checked until it exceeds a given percentage (threshold) (e.g., 2%), indicating that the life of the current shared secret is approaching its allowable limit, and then, at 1008, the update procedure is initiated.

Several embodiments discussed below concern first-time registration of a client device. In an example embodiment, the client new device (to be registered) is authorized with the help of a previously registered device. This action may be performed in several ways explained below. In the following various embodiments, each of the client devices (e.g., the previously registered device and the new device) may be configured accordingly (e.g., configured with a suitable software, such as an application program (application software)). As one example, in accordance with instructions/directives from a master node (e.g. a router), the client devices may be instructed/directed to download application program(s) to carry out various functions disclosed herein by, e.g., executing such application program(s).

In some embodiments, a central/server node, such as router initiates a loop operation by sending a random one-time password to a first registered device, which will be displayed on a screen of the registered device with an instruction asking a device user to enter the one-time password on a keyboard of a second (new) device to be registered. Then, the device to be registered sends the one-time password back to the router, closing the loop. In an example embodiment, the mentioned loop (starting from the "router" going through the "registered device", from the "registered device" to the "device to be registered", and from the "device to be registered" back to the "router") is closed automatically, for example by establishing a Bluetooth connection from the registered device to the device to be registered, passing the one-time password through the Bluetooth connection from the registered device to the device to be registered, and then establishing a Wi-Fi connection between the device to be registered, with the router closing the loop. In this configuration, delay in the loop may be accurately measured and used to detect, e.g., suspicious situations. Further, alternative to the user entering the one-time password on the keyboard of the device to be registered, the one-time password may be in the form of a QR code that appears on the screen of the registered device and may be scanned by a camera of the device to be registered. Other examples of the one-time password entry may be possible as well.

In another embodiment, the loop is closed by using a sound signal to connect the registered device to the device to be registered. The sound signal is designed by the router (e.g., the router is configured with appropriate software/hardware to generate such sound signal) to have a one-time password embedded in the sound signal by modulating the sound signal. The sound signal is transmitted using, e.g., UDP or TCP packets from the router to the registered device, then the registered device extracts the corresponding data, and internally reconstructs the actual sound signal and plays it through speaker(s) of the registered device while having the device to be registered in the vicinity such that the played sound is received by the microphone of the device to be registered. Then, the device to be registered extracts the one-time password from the received sound waveform. Note that, in some embodiments, the conversion of sound to data will typically include some additional redundant bits to enable, e.g., forward error correction and/or error checking of the data at the device to be registered. Upon extracting the data at the device to be registered, the loop will be closed by sending the one-time password (reconstructed at the device to be registered) back to the router. Again, the measurement of the delay in closing the loop may be used to detect suspicious circumstances.

For example, an unexpected delay in closing the loop during an execution of operations described above may indicate a "man-in-the middle" attack. Generally, closing of the loop should be completed within some specified time period, otherwise, it may be considered/declared as a failure. Further, the router, for example, may be configured with an expected or estimated time during which the loop operation should be completed (e.g., when the router establishes a Wi-Fi connection between the device to be registered or upon a receipt of a packet containing the one-time password from the device of to be registered). Hence, the measurement of how long it takes to close the loop (e.g., using a timer at the router) may detect an unexpected delay (e.g., when closing the loop takes substantially longer than it should).

In other examples, a delay during a specific stage of the operation in closing the loop may be an indication of a suspicious activity. To illustrate, in some embodiments, the device to be registered (new device) may install a suitable software program (e.g., an application program) that is configured to synchronize the time of the new device with the time of the router. In one example, a delay count-down starts when the one-time password is received or reconstructed at the device to be registered. The new device (device to be registered) (in accordance with the program) may be configured to insert a current time in a packet containing the one-time password to be sent to the router. Normally, the packet should be received at the router within a few milliseconds. If this is not the case, the router may declare a registration failure since such delay may indicate, e.g., a potential third-party attack.

In another embodiment, the device to be registered and the router coupled together via a wired connection, for example using a USB connection or Ethernet connection. The action of connecting the two devices through the wired connection may confirm that the router and the device to be registered are physically close to each other and thereby minimize or prevent unauthorized registration of devices. In some embodiment, this particular configuration, may be beneficial used for introducing a new device the very first time the router is setup (meaning, e.g., that no trusted or previously registered devices have been yet configured), and a user wishes to introduce the very first trusted device. Such embodiment is described in more detail below.

In this embodiment, upon, e.g., installation of, e.g., a suitable an application program on the device to be connected to the secure (enterprise) mode of the Wi-Fi router, a message may appear on a screen of the device asking the user to plug in a USB device into the router. The procedure steps may be explained on the screen of the device, telling the user to follow, for example, the following steps: (1) plug-in any USB device (e.g., a USB memory stick) into the router, (2) within a specified time period (procedure lifetime), extract the USB device from the router and plug it into the new device. The message may also tellthe user that the procedure at hand has a limited lifetime and, for example, shows a counter on the device acting similar to a count-down watch.

Upon plugging in the USB device into the router, the router may extract, for example, a serial number of the USB device or another identifier uniquely identify the connected USB device. Following the instructions, the user may subsequently plug in the same USB into the new device to be established as the first trusted device, say, e.g., a laptop with a support for USB connection. Upon reading the USB identifier (e.g., the serial number of the USB device, in this example), the new device sends the extracted serial number to the router where it will be compared with the reading of the same serial number performed by the router. If a match exists, then the device is considered legitimate (trusted) and a procedure for establishing a shared secret in accordance with the embodiments disclosed herein may be executed for the first time.

In the above procedure, some variations are possible. For example, the roles of the router and the new device in reading the serial number of the USB device can be swapped. In this case, upon the installation of the program on the device to be connected to the secure (enterprise) mode of the Wi-Fi router, a message will appear on the screen of the device asking the user to plug in the USB device into the new device. The procedure is then again explained on the screen of the new device, which tells the user to follow similar steps as before: (1) plug-in any USB device into the users new device, (2) within a specified time period (procedure life-time), extract the USB device from the new device and plug it into the router. The message also tells the user that the procedure at hand has a limited lifetime, for example, shows a counter on the device acting similar to a count-down watch. Upon plugging in the USB device into the users device, the client device of the user extracts the serial number of the USB device, and sends the extracted serial number to the router. Following the instructions, the user plugs in the same USB device into the router. Upon reading the serial number, the router will compares its reading of the serial number with the serial number sent by the new device. If there is a match, then the new device is considered legitimate (trusted) and the procedure for establishing the shared secret is executed for the first time. As noted above, another identifier uniquely identifying the USB device may be extracted and compared instead of the serial number of the USB device.

In some embodiments, after following the above procedure, the new device will be added as a new entry to the Radius server running on the router (router operates in the enterprise mode). To further enhance security, the serial number (or other identifier, as explained above) of the USB device may be hashed with a salt, using, for example, a time of the day as the salt or transmitting the salt with a message containing the hashed serial number from the transmitting (new client device to be registered) to the receiving party (router). In this case, the receiving party, having access to the serial number and the salt, will be able to repeat the operation used to generate the hash, and, upon reconstructing the content of the hash, compare it with what has been received from the transmitting party, and thereby close the verification loop.

In another embodiment, the router may be equipped with, for example, a push-button or any other suitable means that could be activated when a message instructing the user to do so is displayed on the screen of the device to be registered. In other words, once the router detects that a new device is requesting to be registered with the router, it will display a message on the screen of the device to be registered with a numerical count-down counter and a message that asks the user to activate (in this example, push) the button on the router prior to the count-down counter reaching zero. Minimizing a duration of the count-down counter reduces the chances that a hacker may highjack the current communication session. For this reason, the messages appearing on the device to be registered may start, for instance, with a message asking the user to bring his/her device (device to be registered) close to the router, and, e.g., the same message instructing the user to press a specific key, say "K", on a keyboard of the device (to be registered) when he/she is in the vicinity of the router. In this manner, when the specific letter (here "K") is entered on the keyboard, the user's device informs the router that the client is in the vicinity, and then the router may continue by starting the count-down counter on the device's screen and displaying the message instructing the user to push the aforementioned button on the router. In another embodiment, the router has a key-pad or a touch screen (or other means), and the router displays the one-time password on the screen of the device to be registered and instructs the user to enter the one-time password into the router using the router's key-pad or touch screen.

In some embodiments, a procedure similar to a two-factor authentication is deployed. For example, the router may send an email to the user with a link that is activated within the device to be registered. Note that this procedure constitutes a second factor in the authentication process and provides additional layer of protection when combined with other above-mentioned example registration methods.

Note that, some embodiments described earlier utilize beamforming as the basis for providing a better channel (e.g., a higher SNR) for a legitimate client device. In an example embodiment, a secondary (auxiliary) IEEE802.11g radio, as described earlier, is used for the purpose of sending, e.g., UPD packets and conducting the remainder the procedure that is used for establishing a shared password. This auxiliary radio may be equipped with a beam-forming antenna. The auxiliary radio, when it is not being used for establishing/sharing passwords, may serve as a secondary radio providing data service to various devices within the router network. In particular, most of the Internet of Things (loT) WiFi-enabled nodes rely on IEEE802.11g. The antenna beamforming apparatus may serve a second purpose during the actual data exchange phase with such IoT nodes. As the IoT nodes are typically static, the antenna beam suitable for data exchange with IoT nodes does not need frequent updates. In an example embodiment, the antenna beam of the auxiliary radio (at times of playing its secondary role of data exchange) is selected such that a minimum channel gain to a collection of static Wi-Fi nodes is maximized. In other words, the antenna beam of the auxiliary radio may be selected such that a signal-to-noise ratio (SNR) is improved during normal communication with such static Wi-Fi nodes.

As described above, some embodiments of the present disclosure support two modes for introducing new devices to the "enterprise mode" Wi-Fi network. In some embodiments, a first mode is based on confirming a serial number (or other unique device identifier) of a USB device which is physically moved between a router and the new device, or vice versa. One of the two legitimate nodes (the router or the new (client) device) reads the serial number of an arbitrary USB device and then the USB device is moved to the second node. The second node also reads the same serial number of the USB device, and then the two legitimate nodes check that they have the same serial number. This part may be realized by either sending the serial number, such as in a hashed form, over the air, or over a cable connection between the router and the client device. This method may useful for devices that support wired USB connections, such as, e.g., laptops and computers.

On the other hand, devices such as smartphones may not support USB connections, or if they do, the use of USB connectivity on such devices is typically not widely used. The reason is that devices, such as smartphones for example, do not have the most common form of a USB port (e.g., currently the USB 2/3 type A), which is widely used in laptops or computers. For this reason, example embodiments of the present disclosure provide an alternative method alternative for introducing new devices to the "enterprise mode" Wi-Fi network. This method, as described above, is based on using a trusted device (a device that has been already registered in the "enterprise mode" network) to act as an intermediary. In some embodiments, first, a user may select (via the software program running on the trusted device) that a new device is being added to the "enterprise mode" network using, e.g., a QR option. Then, the router and the trusted device share a one-time password. For example, the router may send a sequence of bits to the trusted device (device acting as the intermediary) to be used as the one-time password. Then, the trusted device generates a QR code containing the one-time password that will be scanned by the new device. Then, the new device sends the content of the one-time password, such as in a hashed form, to the router. The router, upon checking that the two copies of the one-time password match, will register the new device by asking for a login name of the new device (e.g., its MAC address) and, in accordance with various embodiments disclosed herein, may proceed to establish a shared secret with the new device.

Further, note that Wi-Fi standard has currently provisions for multiple frequency bands: 900 MHz, 2.4 GHz, 3.6 GHz, 4.9 GHz, 5 GHz, 5.9 GHz and 60 GHz bands (with a possibility of other band(s) potentially defined in the future). Wi-Fi routers, and most client nodes, typically support at least two frequency bands for their operation, for example, the 2.4 Ghz and 5 Ghz bands. In an example embodiment, one of such two bands, say, e.g., 2.4 Ghz, may be primarily used to support operation in the "residential mode", and the second band, say, e.g., 5 Ghz, may be primarily used for the operation in the "enterprise mode". In this case, in some embodiments, the band used for operation in the "residential mode" may be made responsible for control signaling required to introduce new (or first-time) devices to the second network supported by the router when operating in the "enterprise mode". This may include the initial connection for introducing a new device to the "enterprise mode" Wi-Fi network, where, for example, the information about the serial number of the USB-based authentication or the information relevant to the QR authentication may be transmitted over the "residential mode" network at 2.4 Ghz.

Figure 11A:
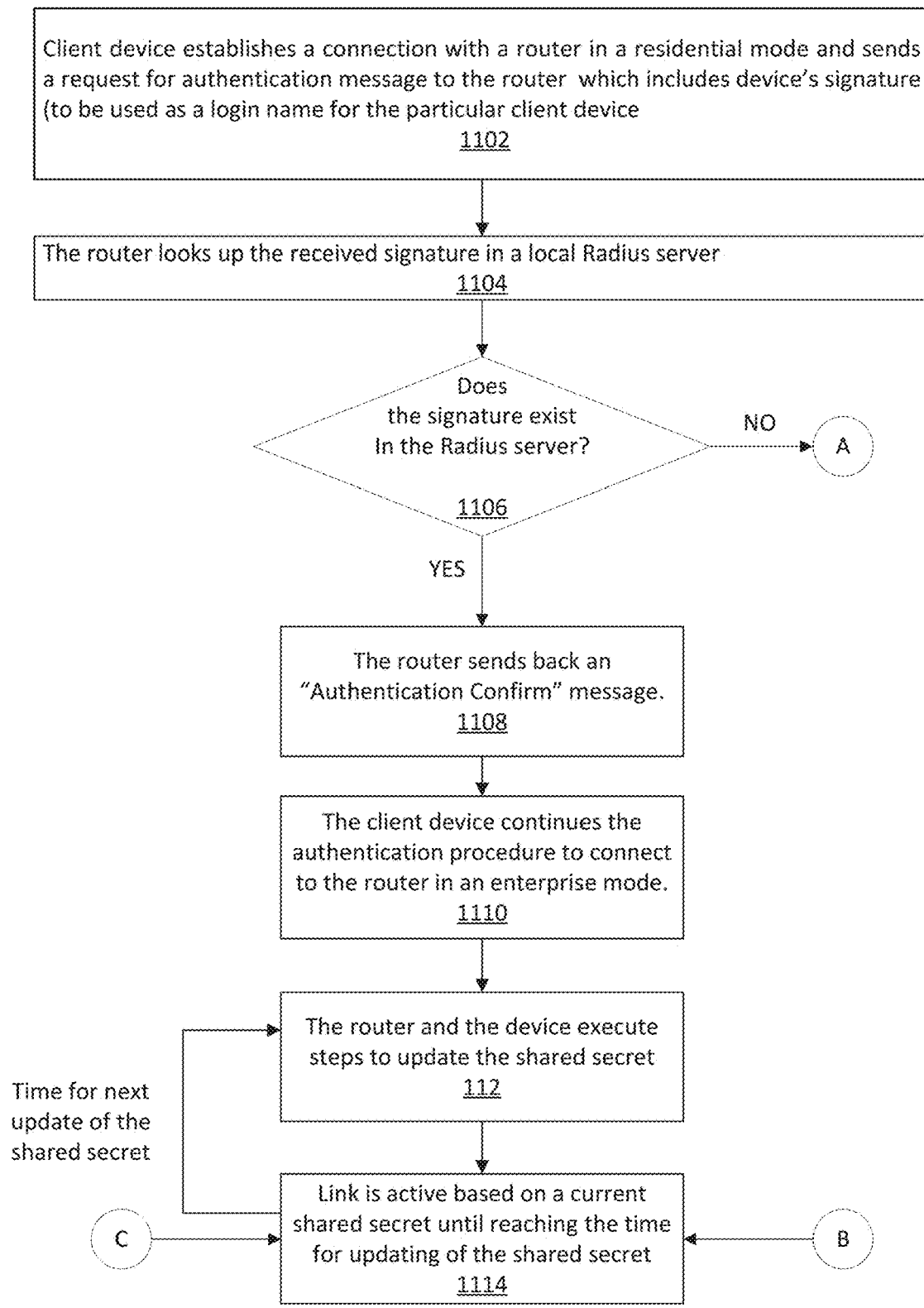
FIGS. 11A-11C are flowcharts illustrating an example method summarizing various example procedures in connection with an operation of a Wi-Fi router and a Wi-Fi client device, in accordance with some embodiments.
Figure 11B:
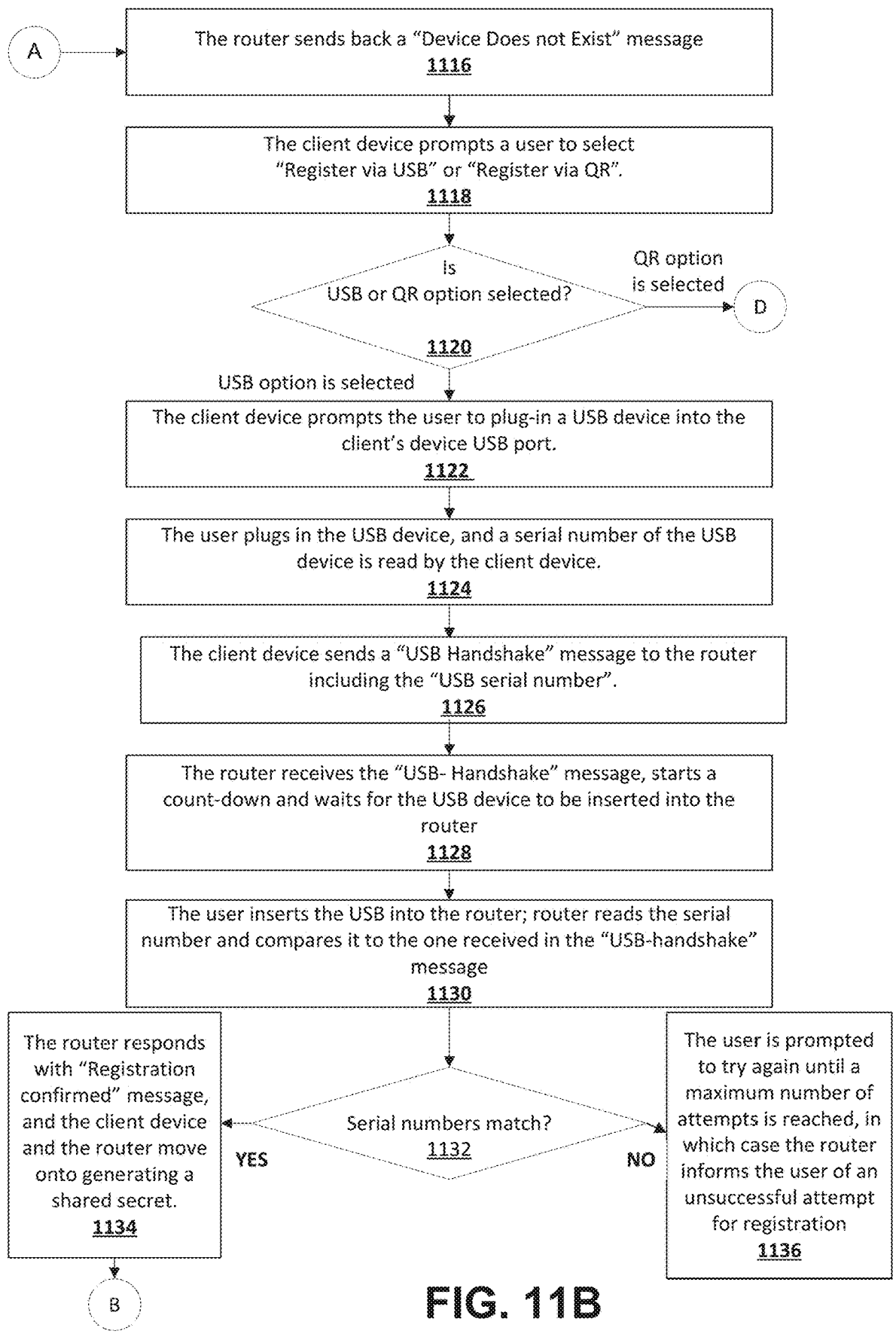
Figure 11C:
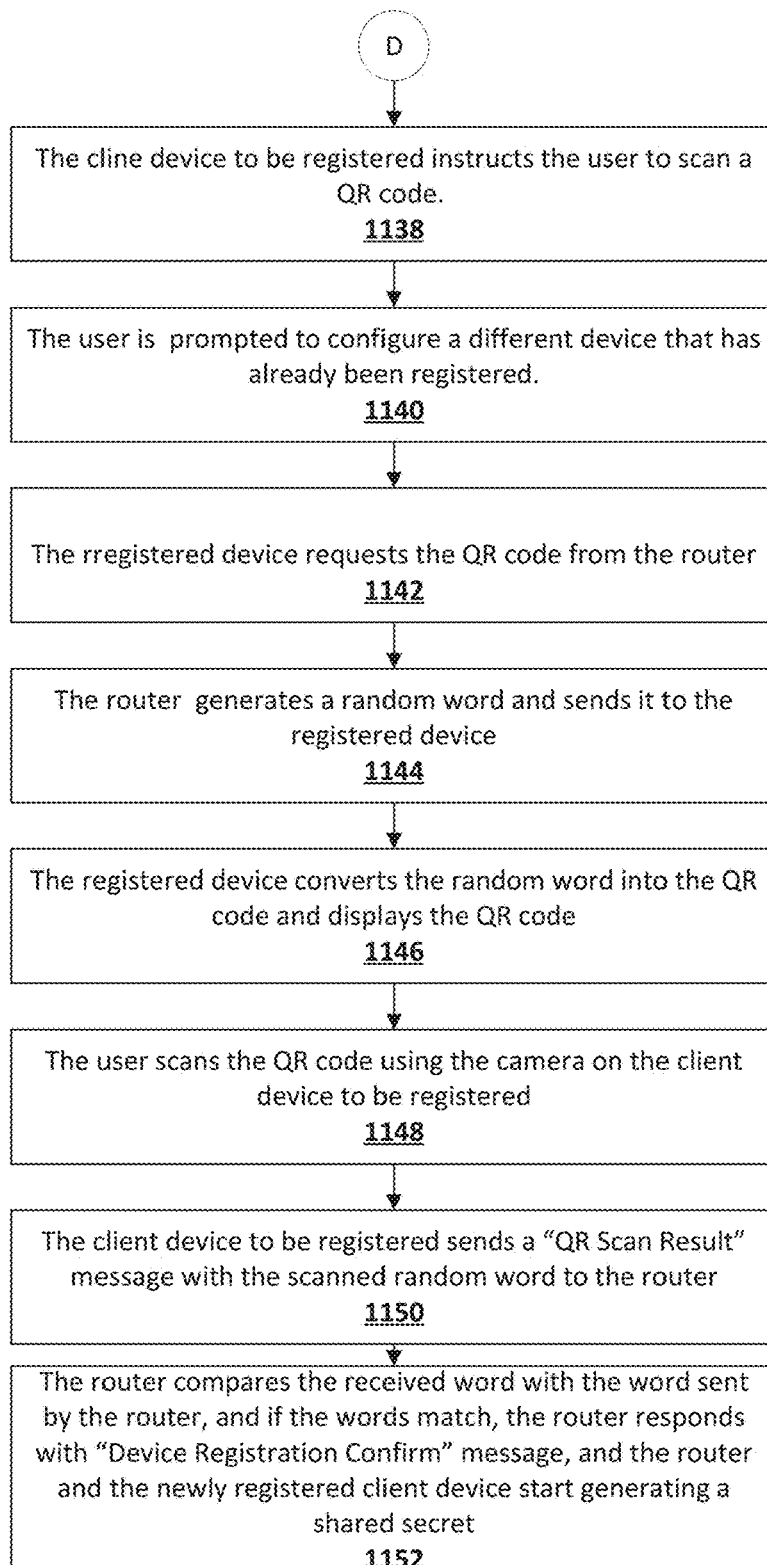

FIGS. 11A-11C are flowcharts illustrating an example method 1100 summarizing various example procedures in connection with an operation of a Wi-Fi router ("router" hereinafter) and a Wi-Fi client device ("client device" hereinafter), in accordance with some embodiments. FIGS. 11A-11C depict details of an example process including, e.g., a registration process, generating and updating a shared secret between the router and the client device, etc. in accordance to various embodiments disclosed herein. In the example method illustrated in FIGS. 11A-11C, the Wi-Fi router (otherwise also commonly referred to as an access point) is equipped with two Wi-Fi radios: a first radio operating in a residential mode and a second radio operating in an enterprise mode. The first radio operating in the residential mode relies on a common shared password for all its users. The client logs in to (i.e., authenticates and then connects to) the "residential mode" router and then client device logs in (i.e., authenticates and then connects to) to the "residential mode router". The radio operating in the "enterprise mode" has a built-in Radius server, storing the devices' login names and devices' passwords. A unique signature from the client device, for example, the device's MAC (Medium Access Control) address, or chip serial number, is used as the login-name for the device. The shared secret established between the client device and the router will be stored as the Wi-Fi password for that particular device in the Radius server. Various details and example processes are described below, according to some illustrative embodiments of the present disclosure.

In the example of FIGS. 11A-11C, the client device is configured, e.g., with a software application ("application" for short) (e.g., suitable program instructions) for carrying out various client-executed functions disclosed herein (including functions involved in establishing and renewing of a shared secret). As noted hereinbefore, such application may be downloaded onto the client device in accordance with, e.g., instructions (e.g., automatically executable instructions), directives, etc. received from the router or in other ways. At the start of the method 1100, although not explicitly shown in FIG. 11A, the client device starts an execution of the application, causing the client device to carry out different example client-executed functions illustrated in FIGS. 11A-11C.

As shown, in 1102, upon execution of the application, the client device establishes a connection with the router in the residential mode and sends a "request for authentication" message to the router that includes the device's unique signature (e.g., a MAC address) (to be used as a login-name for this particular client device). In 1104, the router looks up the received signature of the device in a local Radius server. In 1106, the router determines if the device signature exists (e.g., is stored) in its local Radius server. If the signature (in the form of the login-name) exists in the Radius server, steps 1108 and 1110, as shown in FIG. 11A, are carried out in order to complete the authentication and an enterprise connection for this particular device. In the present example, the authentication is performed according to the Wi-Fi standard protocol defined for the enterprise Wi-Fi, using the device's signature as the login-name and a current shared secret as the device's password. Details of the embodiments associated with this authentication procedure have been described hereinbefore. As shown, in 1110, a connection to the router in the enterprise mode is established. Further, in some embodiments (as shown in FIG. 11A), the shared secret may be updated (e.g., immediately) after the authentication is completed (1112), and then may be renewed on a regular basis (1114). Namely, as shown in 1114, a connection (link) between the router and the client device may be active based on the current shared secret until a time for refreshing (updating) of the shared secret is reached (as determined, for example, in various ways described earlier), at which point the process for updating the shared secret may be executed again (1112).

If, on the other hand, the router determines that the signature of the client device does not exist in the Radius server, the client device should be first registered in the Radius server, and the method 1100 continues to an example procedure (designated by "A") shown in FIG. 11B. Note that, to circumvent situations that hackers can register their own devices over the air, embodiments of the present disclosure include, for example, two options for device registration. As described earlier, in some embodiments, one option is based on using a USB device (e.g., a USB stick) that is physically moved, by a device user, between the router and the client device within, e.g. a certain time window. Further, USB devices normally have a serial number. The serial number (or, alternatively, other identifier uniquely identifying the USB device) is read by the router and by the client device to be registered, and then, via a transmission over the air, it is verified that the USB device identifier (e.g., the serial number) read by the router and by the device are the same. If they match, this confirms that the client device to be registered has been, e.g., in the physical vicinity of the router. Another option, according to some embodiments, is based on using a trusted device (e.g., a device that has already been registered in the Radius server of the router) as an intermediary in registering a new device (the client device to be registered). As described earlier, the second option may, among others, employ a one-time password that, in some embodiments, may be in the form of a QR code that appears on a screen of the trusted (registered) device and may be scanned by a camera of the device to be registered.

FIGS. 11B and 11O depict example processes associated with those two registration options. Namely, in 1116, router may send back a "Device Does not Exist" message for display to the user of the client device (via a GUI (Graphical User Interface) that may be configured as a part of the application executed on the client device). In 1118, the client device may prompt the user to select a "Register via USB" option or a "Register via QR" option. If the USB option is selected, in 1122, the client device prompts the user to plug-in a USB device into the client device's USB port. In 1124, the user plugs in the USB device, and, e.g., a serial number of the USB device is read by the client device. In 1126, the client device sends a "USB Handshake" message to the router including the USB device serial number. In 1128, the outer receives the "USB Handshake" message, starts a count-down, and waits for the USB device to be inserted into the router. Although not explicitly shown, the client device may prompt the user (via a notification on the GUI) to insert the USB device into the router. In 1130, the user inserts the USB device into the router, and the router reads the serial number and compares the read serial number to the one received in the "USB-handshake" message from the client device to be registered. If, in 1132, a match exists, in 1134, the router responds with "Registration confirmed" message and the router and the client device proceed to generating a shared secret in accordance with various embodiments disclosed herein. Subsequently, (as designated by "B"), the process moves back to step 1114 for updating the shared secret on regular basis. In some embodiments, as in 1136, the client device may be configured to prompt the user to try again until a maximum number of attempts is reached, in which case, the router informs the user (via a suitable notification message displayed to the user on the client device) of an unsuccessful attempt for registration.

If, on the other hand, in 1120, the QR registration option is selected by the user, the method 1100 continues to an example procedure (designated by "D") shown in FIG. 11C. First, in 1138, the client device (to be registered) instructs the user to scan a QR code. In this regard, in 1140, the router prompts the user to configure (such as by, e.g., executing a suitable application) on a client device that has already been registered (trusted device). Then, in 1142, the trusted device (e.g., in response to a user action) requests the router for the QR code. The router, in 1144, sends a random word, such as a 256-bits randomly generated word, to the trusted device. In 1146, the trusted device converts the random word into the QR code and displays it on a screen the trusted device. Then, in 1146, the user of the client device (to be registered) scans the QR code from the screen of the trusted device using, e.g., a camera of the client device. In 1148, a result of the scan (the random word scanned by the to-be registered client device) is sent by the client device to the router, where it is checked against the random word initially sent by the router (in 1144). If the random word match, the router confirms the registration of the client device that becomes a newly registered device, and the router and the newly registered client device start generating a shared secret. Subsequently, (as designated by "C"), the process moves back to step 1114 for updating the shared secret on regular basis. Although not explicitly shown in FIG. 11C, in the event the random words do not match, the router may send a suitable notification to the client device for display to the user, notifying the user of a registration failure. is confirmed if the scanned word matches the random word initially generated by the router.

Figure 12:
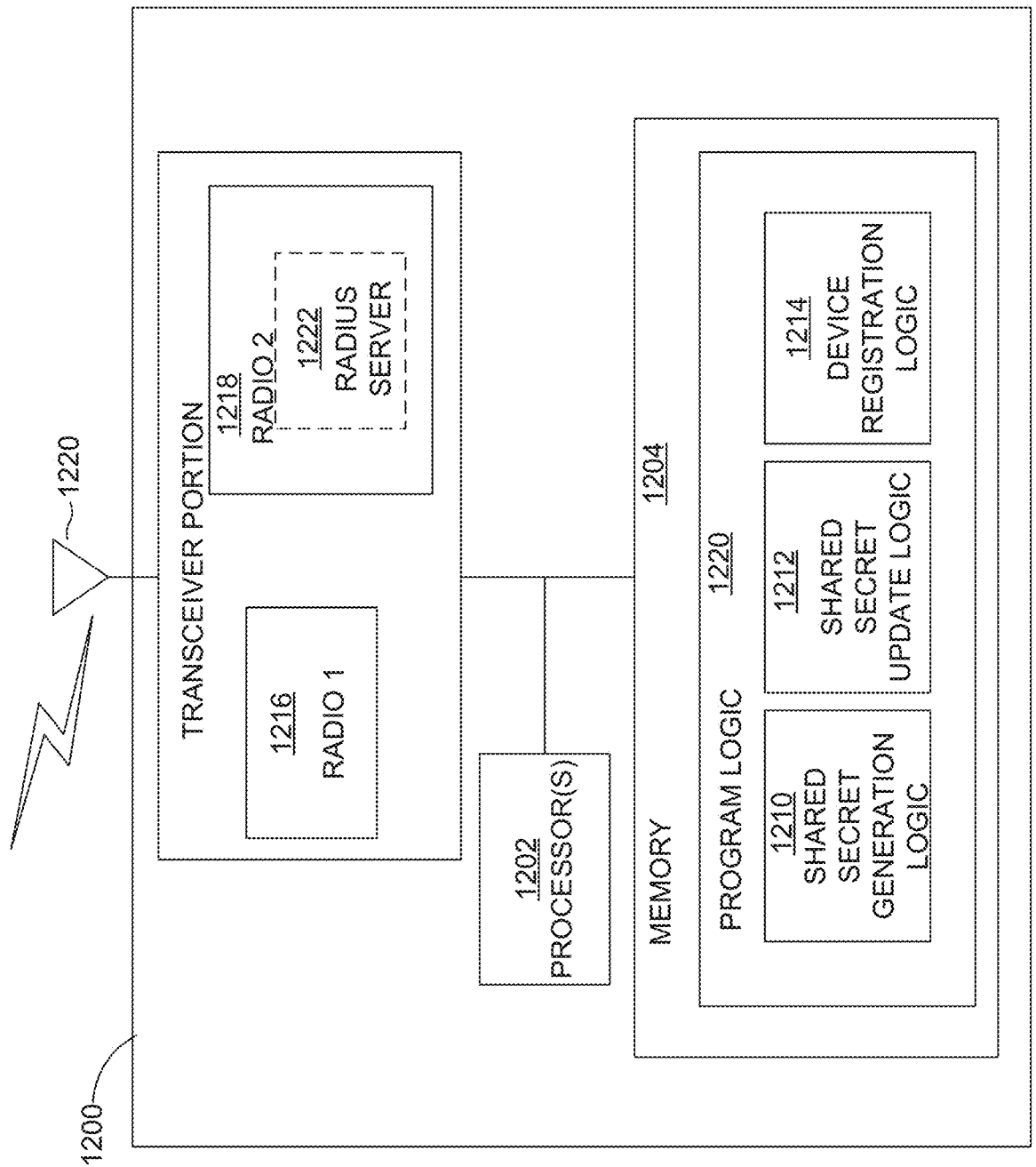
FIG. 12 is a block diagram of an example router, in accordance with some embodiments.

FIG. 12 is a block diagram of an example router 1200, according to some embodiments of the As depicted in FIG. 12, the router 1200 may include one or more processor 1202, a memory 1204, and a transceiver portion 1206, all coupled together via a system bus or other mechanism 1208. Further, as shown in FIG. 12, the memory 1204 includes program logic 1220 for carrying out various function described herein, including, among others, a shared secret generation logic 1210, a shared secret update logic 1212, and a device registration logic 1214. Although those modules are shown separately, in some embodiments, they may be combined together, etc.

The transceiver portion 1206 may include a first radio 1216, such as a first Wi-Fi radio configured for operation in a residential mode, and a second radio 1218, such as a second Wi-Fi radio configured for operation in an enterprise mode, as described in various embodiments of the present disclosure. For example, in some embodiments described herein, the first radio 1216 may be configured to operate in the residential mode with a shared password being used for all of client devices, while the second radio 1218 may be configured to operate in the enterprise mode with a separate password for each of client devices that are each uniquely identified by a respective signature (e.g., a MAC address) that corresponds to a login name of the client device for communications in the enterprise mode. As shown, the router 1200 may further include an antenna 1220 for communications with the client nodes.

However, this system arrangement is shown for purpose of example only, and the router 1200 may also include other components not shown in FIG. 12. As an example, the router 1200 may include a number of interfaces (e.g., a communication interface, input/output interface, etc.), e.g., for communicating with other entities, such as client nodes, and/or communicating data to/from the data storage 1204. Further, as disclosed in some embodiments herein, the transceiver portion 1206 may include, e.g., a noise source for generating noise to introduce interference into a transmit signal (as explained earlier) and/or an additional tunable attenuator to adjust transmit power beyond capabilities of, e.g., typical Wi-Fi routers.

The processor(s) 1202 may be one or more central processing units (CPUs), general purpose processors, and/or dedicated processors (e.g., application specific integrated circuits (ASICs) or digital signal processors (DSPs). The memory 1204 may be a non-transitory computer readable (storage) medium, and can be a volatile and/or nonvolatile type of data storage.

Further, the memory 1204 may store program logic including program instructions (e.g., machine language instructions or any other higher-level programming instructions as mentioned above, such as in the form of a higher-level programming (e.g., application-layer programming in the form of an application program) executable by the processor(s) 1202 to carry out various functions described herein. By way of example, the memory 1204 may store the shared secret generation logic 1210 that includes program instructions for carrying out various functions associated with generating of a shared secret (e.g., a password and/or an encryption key), the shared secret update logic 1212 for carrying out various functions associated with updating of the shared secret, and a device registration logic 1214 for carrying out various functions associated with a registrations of client devices, as described herein in accordance with various embodiments. Although shown separately, the individual program logic modules may be combined into, e.g., a single application program for execution by the processor(s) 1202. The memory 1204 can also store other data used by the program logic (e.g., database(s) for storing client device information, etc.).

In addition, the radio 1218 may be associated with a Radius server 1222 (e.g., have a built-in Radius server as shown in FIG. 12). As described herein, such Radius server 1222 may be configured to store login names (e.g. MAC addresses) uniquely identify respective client devices, as well as passwords associated with respective client devices.

In the foregoing specification, specific embodiments have been described. However, one of ordinary skill in the art would appreciate that various modifications and changes may be made without departing from the scope as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about", or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Some embodiments may comprise one or more generic or specialized processors (or "processing devices") such as microprocessors, digital signal processors, customized processors and field-programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application-specific integrated circuits (ASICs), in which each function or some combinations of certain of the functions are implemented as custom logic. Of course, a combination of the two approaches could be used.

Accordingly, some embodiments of the present disclosure, or portions thereof, may combine one or more processing devices with one or more software components (e.g., program code, firmware, resident software, micro-code, etc.) stored in a tangible computer-readable memory device, which in combination form a specifically configured apparatus that performs the functions as described herein. These combinations that form specially programmed devices may be generally referred to herein as "modules." The software component portions of the modules may be written in any computer language and may be a portion of a monolithic codebase, or may be developed in more discrete code portions such as is typical in object-oriented computer languages. In addition, the modules may be distributed across a plurality of computer platforms, servers, terminals, and the like. A given module may even be implemented such that separate processor devices and/or computing hardware platforms perform the described functions.

Moreover, an embodiment may be implemented as a computer-readable storage medium having computer-readable code stored thereon for programming a computer (e.g., comprising a processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read-Only Memory), an EPROM (Erasable Programmable Read-Only Memory), an EEPROM (Electrically Erasable Programmable Read-Only Memory) and a Flash memory. Further, one of ordinary skill, notwithstanding possibly significant effort and many design choices may be motivated by, for example, available time, current technology, and economic considerations, when guided by the concepts and principles disclosed herein will be readily capable of generating such software instructions and programs and ICs with minimal experimentation.

The invention claimed is:

1. A method comprising:
   receiving a sequence of data packets from a first node at a second node;
   generating, at the second node, a packet error bitmap corresponding to error-free packets in the sequence of packets that are received error free in a first transmission attempt;
   transmitting, from the second node to the first node, the packet error bitmap; and
   mixing, at the second node, the error-free packets to generate a shared secret.

2. The method of claim 1, wherein the generated shared secret is a newly generated shared secret, and where the mixing includes mixing the generated shared secret with a current shared secret used by the first node and the second node.

3. The method of claim 1, wherein the shared secret is used as an encryption key for secure communications between the first node and the second node.

4. The method of claim 1, wherein the shared secret is used as a password for authentication between the first node A and the second node.

5. The method of claim 1, wherein the sequence of packets is transmitted using a transport protocol without an Automatic Repeat Request (ARQ) at any network layer.

6. The method of claim 1, wherein the sequence of packets is transmitted using a transport protocol that allows disabling an Automatic Repeat Request (ARQ) at all network layers.

7. The method of claim 1, wherein the sequence of packets is transmitted using a broadcast or multicast protocol.

8. The method of claim 1, wherein the sequence of packets are transmitted using a transport protocol that includes an Automatic Repeat request (ARQ) at all network layers, the method further comprising:
   classifying packets in the sequence of packets that are received at the second node into a first class and a second class, wherein the first class includes packets received correctly in the first transmission attempt and the second class includes remaining packets in the received sequence of packets; and
   using the packets in the first class as the error-free packets to generate the shared secret.

9. The method of claim 8, wherein the classifying includes using a respective travel time of each received packet to divide the received packets into the first and second classes, wherein packets with respective shorter travel times are classified into the first class, and wherein the packets with respective longer travel times are classified into the second class.

10. The method of claim 1, further comprising transmitting packet error-rate messages from the second node to enable the first node to adjust at least one of a transmit power and a modulation index to achieve a target packet error rate at the second node.

11. The method of claim 10, wherein when the target packet error rate is achieved, a packet error rate observed by a potential eavesdropping node is higher than the target packet error rate at the second node.

12. The method of claim 1, wherein the packet error bitmap comprises an error bitmap vector including a sequence of bits indicating which packets in the sequence of packets are error-free packets.

13. A method comprising:
transmitting a sequence of data packets from a first node to each of a plurality of additional nodes;
receiving, at the first node, error-free packet bitmap messages from the plurality of additional nodes corresponding to packets in the sequence of packets received correctly at the respective additional nodes;
forming, at the first node, a composite packet error bitmap corresponding to error-free packets received correctly at each of the plurality of additional nodes;
transmitting, from the first node, the composite error bitmap; and
mixing, at the first node, the error-free packets to generate a shared secret.

14. The method of claim of claim 13, wherein the generated secret is a newly generated shared secret, and where the mixing includes mixing the generated shared secret with a current shared secret.

15. The method of claim 13, wherein the shared secret is an encryption key for secure communications between the first node and each of the additional nodes.

16. The method of claim 13, wherein the first node is a Wi-Fi router operating in a residential mode, the shared secret is a shared password to be used by the plurality of additional nodes when connecting to the router in the residential mode.

17. An apparatus comprising:
a non-transitory computer-readable storage medium holding a plurality of program instructions that, when executed by the at least one processor, cause the at least one processor to:
transmit a sequence of data packets from a first node to a second node;
generate, at the second node, a packet error bitmap corresponding to packets in the sequence of packets that are received correctly in a first transmission attempt;
transmit, from the second node to the first node, the packet error bitmap; and
mix, separately at the first node and the second node, the packets received correctly in the first transmission attempt to generate the shared secret.

18. The apparatus of claim 17, wherein the generated secret is a newly generated shared secret, and wherein the plurality of program instructions, when executed by the at least one processor, further cause the at least one processor to further mix the generated shared secret with a current shared secret used by the first node and the second node.

* * * * *